United States Patent
Narita et al.

(10) Patent No.: US 6,385,464 B1
(45) Date of Patent: May 7, 2002

(54) BASE STATION FOR MOBILE COMMUNICATION SYSTEM

(75) Inventors: Masahiro Narita, Gifu; Yasunori Akatsuka, Hashima; Yasukazu Kamei, Ikoma, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/297,077
(22) PCT Filed: May 27, 1997
(86) PCT No.: PCT/IB97/00597
   § 371 Date: Jul. 2, 1999
   § 102(e) Date: Jul. 2, 1999
(87) PCT Pub. No.: WO98/24195
   PCT Pub. Date: Jun. 4, 1998

(30) Foreign Application Priority Data

Nov. 26, 1996 (JP) .............................. 8-314857
Jan. 28, 1997 (JP) .............................. 9-14204

(51) Int. Cl.$^7$ ................................ H04Q 7/20
(52) U.S. Cl. ...................... 455/561; 455/562
(58) Field of Search ................ 455/561, 562, 455/277.1, 277.2, 78, 101, 102, 279.1, 88, 82, 550, 560; 375/267, 347; 370/334, 314, 321, 294, 280

(56) References Cited

U.S. PATENT DOCUMENTS

| | | | | |
|---|---|---|---|---|
| 4,383,332 A | * | 5/1983 | Glance et al. | 455/562 |
| 5,303,396 A | * | 4/1994 | Ooyagi et al. | 455/134 |
| 5,329,555 A | * | 7/1994 | Marko et al. | 375/347 |
| 5,369,801 A | * | 11/1994 | Smith | 455/277.1 |
| 5,438,565 A | * | 8/1995 | Hemmady et al. | 370/335 |
| 5,459,873 A | * | 10/1995 | Moore et al. | 455/277.1 |
| 5,628,052 A | * | 5/1997 | DeSantis et al. | 455/562 |
| 5,640,678 A | * | 6/1997 | Ishikawa et al. | 455/449 |
| 5,764,697 A | * | 6/1998 | Sakuma et al. | 375/239 |
| 5,809,405 A | * | 9/1998 | Yamaura | 455/101 |
| 5,870,001 A | * | 2/1999 | Osterling et al. | 331/11 |
| 5,870,681 A | * | 2/1999 | Myer | 455/562 |
| 5,918,164 A | * | 6/1999 | Takahashi et al. | 455/134 |
| 6,006,075 A | * | 12/1999 | Smith et al. | 455/101 |

FOREIGN PATENT DOCUMENTS

| | | |
|---|---|---|
| JP | 4-292023 | 10/1992 |
| JP | 5-183475 | 7/1993 |
| JP | 5-300051 | 11/1993 |
| JP | 6-13951 | 1/1994 |
| JP | 6-338835 | 12/1994 |
| JP | 7-274252 | 10/1995 |

* cited by examiner

Primary Examiner—Nay Maung
Assistant Examiner—Jean A Gelin
(74) Attorney, Agent, or Firm—Arent Fox Kintner Plotkin & Kahn, PLLC

(57) ABSTRACT

The present invention is aimed at providing a base station for mobile communication systems which is capable of communicating with more mobile station than in the prior art while keeping high communication quality and restraining a rise in production cost. The base station of the present invention is used in mobile communication systems in which diversity is conducted. Such a base station includes an RF unit for generating a plurality of high-frequency transmission signals, an antenna selecting unit for switching connection of the transmission signal output of the RF unit from one antenna to another, a cross switch 460 for switching the data transmission route between straight connection and cross connection by inputting transmission data from TDMA processing units 471 and 472 interchangeably to transmitting units 433 and 434 of the RF unit, and a control unit 446 for controlling the antenna selecting unit so that the transmission signals will be connected to different antennas, respectively.

23 Claims, 38 Drawing Sheets

FIG. 7

| ANTENNA SELECTION | | ANTENNA SELECTING SWITCH SETTING | |
|---|---|---|---|
| SYSTEM 1 | SYSTEM 2 | SWITCH 151 | SWITCH 152 |
| 101 | 102 | A | B |
| 101 | 103 | A | C |
| 101 | 104 | A | D |
| 102 | 101 | B | A |
| 102 | 103 | B | C |
| 102 | 104 | B | D |
| 103 | 101 | C | A |
| 103 | 102 | C | B |
| 103 | 104 | C | D |
| 104 | 101 | D | A |
| 104 | 102 | D | B |
| 104 | 103 | D | C |

FIG. 10

| ANTENNA SELECTION | | ANTENNA SELECTING SWITCH SETTING | | | | | | |
|---|---|---|---|---|---|---|---|---|
| SYSTEM 1 | SYSTEM 2 | SWITCH 151 | SWITCH 152 | SWITCH 115 | SWITCH 116 | SWITCH 117 | SWITCH 104 |
| 101 | 102 | A | B | a | b | a or b | a or b |
| 101 | 103 | A | C | a | a or b | b | a or b |
| 101 | 104 | A | D | a | a | a or b | b |
| 102 | 101 | B | A | b | a | a or b | a or b |
| 102 | 103 | B | C | a or b | a | b | a or b |
| 102 | 104 | B | D | b | a | a | b |
| 103 | 101 | C | A | a or b | b | a | a or b |
| 103 | 102 | C | B | b | a or b | a | a or b |
| 103 | 104 | C | D | b | a or b | a | b |
| 104 | 101 | D | A | a or b | b | a or b | a |
| 104 | 102 | D | B | a or b | b | a or b | a |
| 104 | 103 | D | C | a or b | a or b | b | a |

FIG. 12

| ANTENNA SELECTION | | SETTING OF ANTENNA SELECTING SWITCH AND CROSS SWITCH | | | | | | | | | |
|---|---|---|---|---|---|---|---|---|---|---|---|
| SYSTEM 1 | SYSTEM 2 | SWITCH 151 | SWITCH 152 | SWITCH 158 | SWITCH 154 | SWITCH 155 | SWITCH 156 | SWITCH 111 | SWITCH 112 | SWITCH 113 | SWITCH 114 |
| 101 | 102 | A | B | a | b | a or b | a or b | a | a | a | a |
| 101 | 103 | A | C | a | a or b | b | a or b | a | a | a | a |
| 101 | 104 | A | D | a | a or b | a or b | b | a | a | a | a |
| 102 | 101 | B | A | b | a | a or b | a or b | a | a | a | a |
| 102 | 103 | B | C | a or b | a | b | b | a | a | a | a |
| 102 | 104 | B | D | a or b | a | a or b | a or b | a | a | a | a |
| 103 | 101 | C | A | b | b | a | a or b | a | a | a | a |
| 103 | 102 | C | B | a or b | a or b | a | b | a | a | a | a |
| 103 | 104 | C | D | a or b | a or b | a | a | a | a | a | a |
| 104 | 101 | D | A | b | b | a or b | a | a | a | a | a |
| 104 | 102 | D | B | a or b | b | a or b | a | a | a | a | a |
| 104 | 103 | D | C | a or b | a or b | b | a | a | a | a | a |

FIG. 16

| ANTENNA SELECTION | | SETTING OF ANTENNA SELECTING SWITCH AND CROSS TUNER SWITCH | | | | | | | |
|---|---|---|---|---|---|---|---|---|---|
| SYSTEM 1 | SYSTEM 2 | SWITCH 409 | SWITCH 410 | SWITCH 411 | SWITCH 412 | SWITCH 413 | SWITCH 414 | SWITCH 460 |
| 401 | 403 | A | A | a | a | a | a | S |
| 401 | 404 | A | B | a | a | a | a | S |
| 402 | 403 | B | A | a | a | a | a | S |
| 402 | 404 | B | B | a | a | a | a | S |
| 403 | 401 | A | A | a | a | a | a | C |
| 403 | 402 | B | A | a | a | a | a | C |
| 404 | 401 | A | B | a | a | a | a | C |
| 404 | 402 | B | B | a | a | a | a | C |

FIG. 22

| ANTENNA SELECTION | | SETTING OF ANTENNA SELECTING SWITCH AND CROSS SWITCH | | | | | | | | | |
|---|---|---|---|---|---|---|---|---|---|---|---|
| | SYSTEM 1 | SYSTEM 2 | SWITCH 495 | SWITCH 496 | SWITCH 481 | SWITCH 482 | SWITCH 483 | SWITCH 484 | SWITCH 485 | SWITCH 486 | SWITCH 487 | SWITCH 488 | SWITCH 460 |

| | | SYSTEM 1 | SYSTEM 2 | SWITCH 495 | SWITCH 496 | SWITCH 481 | SWITCH 482 | SWITCH 483 | SWITCH 484 | SWITCH 485 | SWITCH 486 | SWITCH 487 | SWITCH 488 | SWITCH 460 |
|---|---|---|---|---|---|---|---|---|---|---|---|---|---|---|
| TRANSMISSION | A | 401 | 402 | A | A | a | a | a | a | b | b | b | b | S |
| | B | 401 | 403 | A | C | a | a | a | a | b | b | b | b | S |
| | C | 401 | 404 | A | D | a | a | a | a | b | b | b | b | S |
| | D | 402 | 401 | A | A | a | a | a | a | b | b | b | b | C |
| | E | 402 | 403 | B | C | a | a | a | a | b | b | b | b | S |
| | F | 402 | 404 | B | D | a | a | a | a | b | b | b | b | S |
| | G | 403 | 401 | A | C | a | a | a | a | b | b | b | b | C |
| | H | 403 | 402 | B | C | a | a | a | a | b | b | b | b | C |
| | I | 403 | 404 | D | D | a | a | a | a | b | b | b | b | S |
| | J | 404 | 401 | A | D | a | a | a | a | b | b | b | b | C |
| | K | 404 | 402 | B | D | a | a | a | a | b | b | b | b | C |
| | L | 404 | 403 | D | D | a | a | a | a | b | b | b | b | C |
| RECEPTION | ALL ANTENNAS | ALL ANTENNAS | — | — | b | b | b | b | a | a | a | a | — |

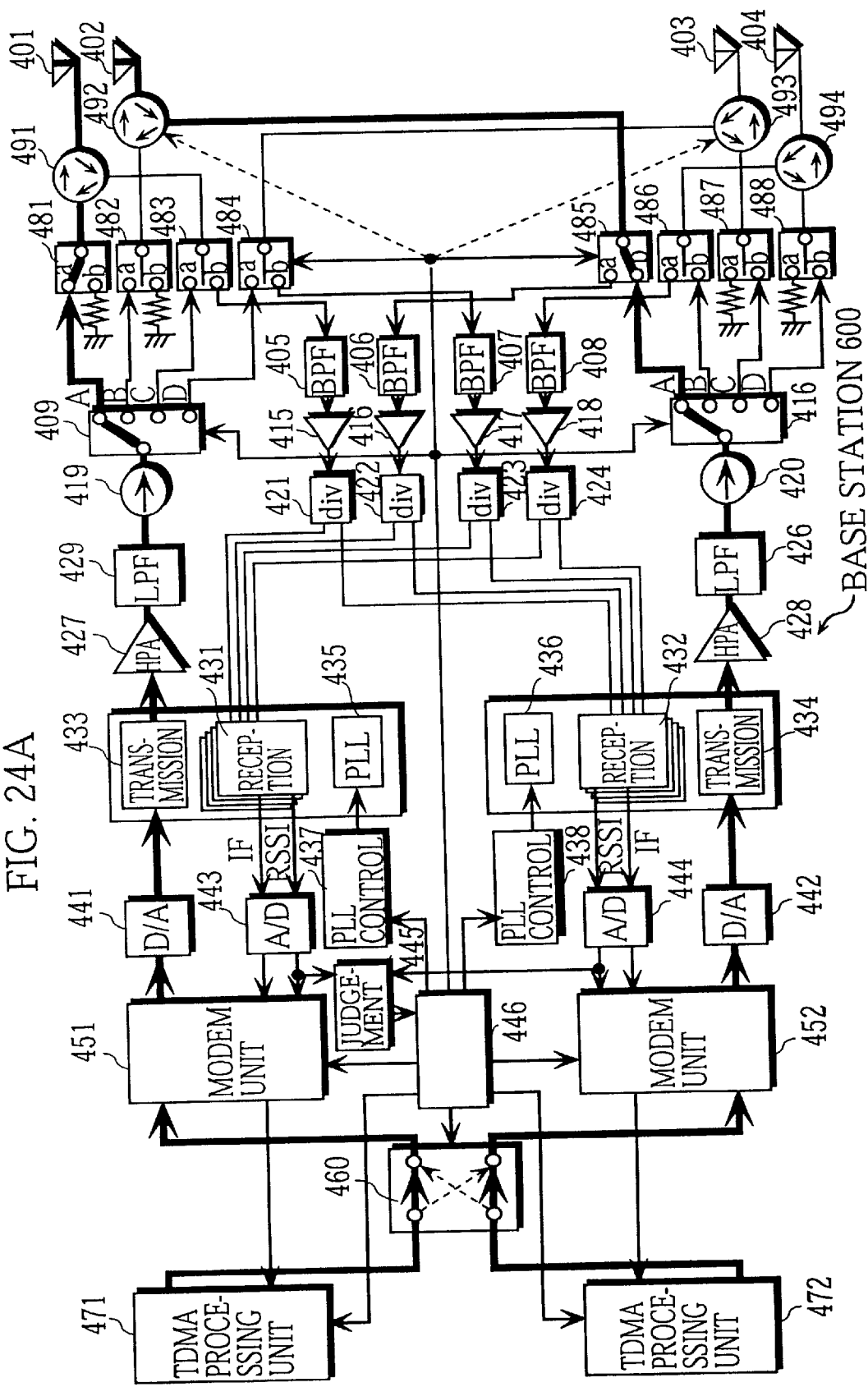

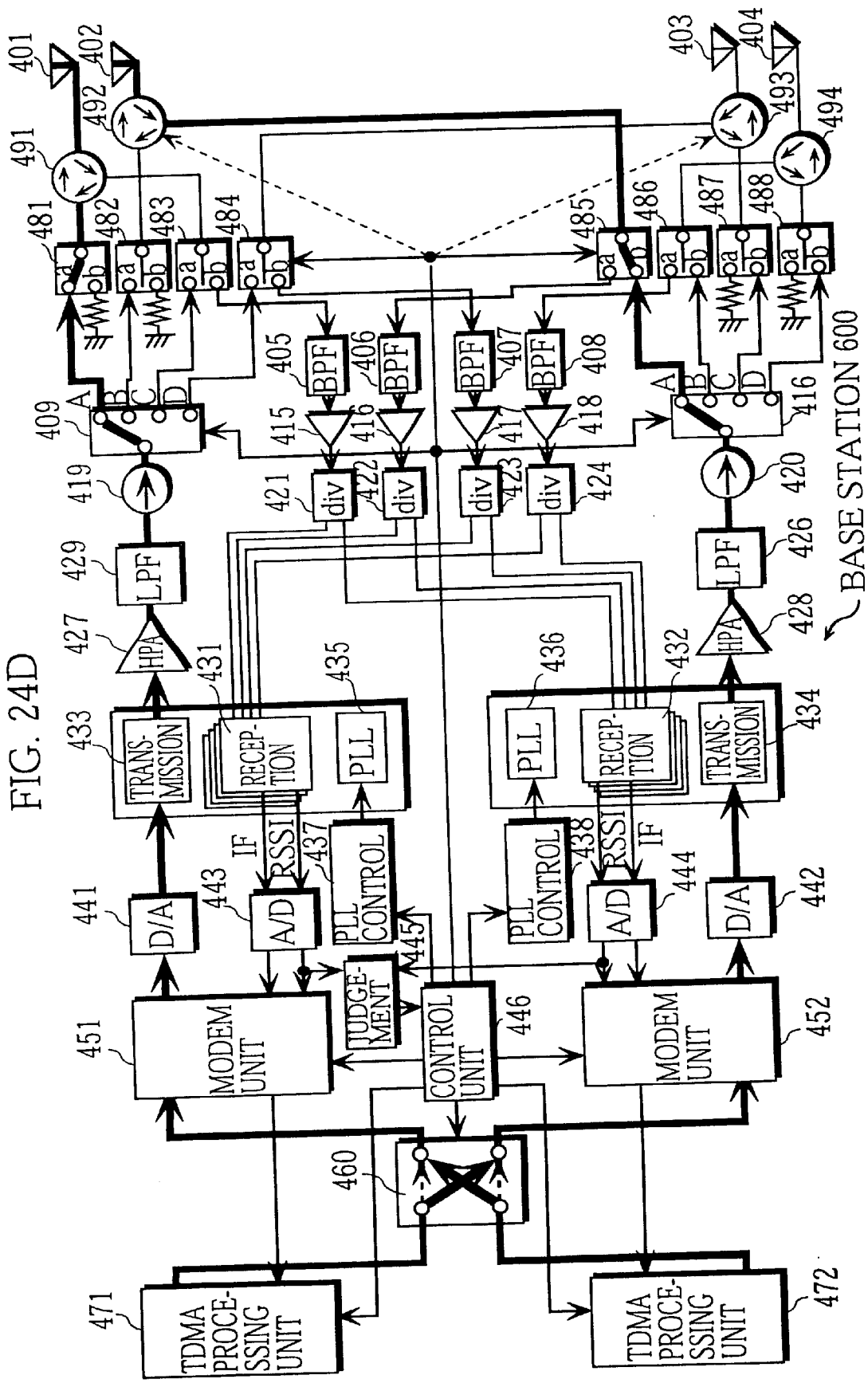

FIG. 25

|  | ANT 1 | ANT 2 | ANT 3 | ANT 4 |
|---|---|---|---|---|
| SYSTEM 1 | RSSI LEVEL : 81 (PRIORITY ORDER) : 2 | RSSI LEVEL : 91 (PRIORITY ORDER) : 1 | RSSI LEVEL : 71 (PRIORITY ORDER) : 3 | RSSI LEVEL : 61 (PRIORITY ORDER) : 4 |
| SYSTEM 2 | RSSI LEVEL : 80 (PRIORITY ORDER) : 2 | RSSI LEVEL : 90 (PRIORITY ORDER) : 1 | RSSI LEVEL : 70 (PRIORITY ORDER) : 3 | RSSI LEVEL : 60 (PRIORITY ORDER) : 4 |
| SYSTEM 3 | RSSI LEVEL : 92 (PRIORITY ORDER) : 1 | RSSI LEVEL : 81 (PRIORITY ORDER) : 3 | RSSI LEVEL : 91 (PRIORITY ORDER) : 2 | RSSI LEVEL : 80 (PRIORITY ORDER) : 4 |

FIG. 26

ANTENNA ALLOCATION RESULT

|  | ANT 1 | ANT 2 | ANT 3 | ANT 4 |
|---|---|---|---|---|
| SYSTEM 1 | ○ |  |  |  |
| SYSTEM 2 |  | ○ |  |  |
| SYSTEM 3 |  |  | ○ |  |

BASE STATION FOR MOBILE COMMUNICATION SYSTEM

FIELD OF THE INVENTION

The present invention relates to a base station for mobile communication systems, such as Personal Handyphone System (hereinafter referred to as "PHS"), in which radio communication is performed between the base station and mobile stations in the service area by a diversity method.

BACKGROUND OF THE INVENTION

In recent years, services in radio communication between a base station and a plurality of mobile stations have spread widely, and the PHS, which provides such communication services at lower rates, has been put to practice. In the PHS, an apparatus at a base station has become smaller and less expensive by reducing its transmission power. As a result, the service area of the base station has also become smaller, and a large number of base stations are spaced at shorter intervals.

FIG. 1 shows an example TDMA/TDD (Time Division Multiple Access/Time Division Duplex) frame (hereinafter referred to as "TDD frame") for communication between a base station CS and mobile stations PS1 to PS3 in the conventional PHS. In this figure, "∩" indicates a time slot, "T" indicates transmission, and "R" indicates reception. Under the PHS standard (RCR STD-28), each TDD frame should be 5 msec, and each time slot should be 625 μsec.

In the conventional PHS, a time slot 1 (#1) in the TDD frame is used as a control channel, while time slots 2 to 4 (#2 to #4) are used as communication channels.

The base station CS uses the control channel #1 (#1T and #1R) to perform communication every 100 msec for registering the position of the mobile stations PS within the service area and for setting communication channels for the mobile stations PS. For instance, the base station CS and each mobile station PS communicate with each other on a carrier frequency of the carrier number 71 (1916.150 MHz) prescribed in the PHS standard.

In the above communication channel setting process, the base station CS allocates one vacant slot of the communication channels (#2 to #4) to a corresponding mobile station PS. A carrier frequency selected from available outdoor public communication carriers prescribed by the PHS standards is allocated to the mobile station PS for communication in the allocated slot. The mobile station PS then switches to the allocated communication channel and communicates in the allocated slot on the allocated frequency.

When the base station CS conducts radio communication with the mobile station PS in the above PHS, there is a problem that communication between the base station CS and the mobile station PS deteriorates due to fading and the like. Fading is caused by interference between an electric wave which has directly reached the mobile station from the base station and a reflected wave or diffracted wave which has reached the mobile station after being reflected by a building or the like. For this reason, communication systems such as reception diversity and transmission diversity have been employed.

Diversity methods are aimed at reducing adverse influence of fading by composing the outputs of two or more systems which have little correlation with each other and little possibility of lowering their communication quality at the same time. Reception diversity methods include a method in which a plurality of antennas arranged at predetermined intervals receive electric waves, and the input received by the antenna that gives the highest input signal level (or RSSI: Received Signal Strength Indicator) is selectively demodulated. Transmission diversity methods include a method in which a plurality of antennas arranged at predetermined intervals receive electric waves, and transmission is performed through the antenna that gives the highest input signal level.

As described above, conventional PHS base stations have been made compact and the production costs have been lowered by reducing the transmission power of each base station, so that subscribers can get the communication service at low rates.

If many base stations are installed in an expensive area, such as an urban area or a central area in the national capital region, the installation costs of the base stations will be higher even though the base stations themselves are inexpensive. For this reason, there have been demands that the base stations be installed at longer intervals, while allowing a reasonable rise in price due to the improved functions and high performance.

In an urban area or a central area in the national capital region, the communication traffic per unit area is high. If the installation density of base stations in such areas, the quality of the communication service provided will be lower, leaving the above problems unsolved.

To solve the above two problems, that is, to reduce the installation density and maintain the quality of communication service, each base station should have higher transmission and reception performance, and be capable of connecting more mobile stations per unit time.

More specifically, the following method can be employed. One base station should be able to relay communication data to more mobile stations using a plurality of TDD frames simultaneously. In the TDD frames, different carrier frequencies are allocated to corresponding time slots.

FIG. 2 shows channel allocation of each TDD frame on the base station side, where different carrier frequencies are allocated to corresponding time slots of two TDD frames. In this figure, "#" indicates each time slot, "T" indicates transmission, and "R" indicates reception.

A first TDD frame shown in FIG. 2 consists of time slots 1 to 4 (#1 to #4) in both the upstream and downstream, like the TDD frame shown in FIG. 1. The time slot #1 is used as a control channel, and communication in the control channel is conducted on a carrier frequency of 1916.150 MHz (carrier number 71). The time slots #2 to #4 are used as communication channels.

A second TDD frame shown in FIG. 2 is in synchronization with the first TDD frame, and consists of time slots 5 to 8 (#5 to #8) both in the upstream and downstream. The time slots #5 to #8 can be all used as communication channels, because the time slot #1 of the TDD frame is allocated as the control channel.

As for the carrier frequencies, a carrier frequency allocated to the communication channel #5 is naturally different from the carrier frequency allocated to the control channel #1. As for two corresponding communication channels used at the same time, two different carrier frequencies of the outdoor public communication frequencies, other than the frequency of carrier number 71, are allocated. For instance, two different carrier frequencies are allocated to the time slot #2 of the first TDD frame and the time slot #6 of the second TDD frame.

By using two TDD frames as above, one base station can relay communication data to more mobile stations than in the case where two base stations CS of FIG. 1 are used for communication. The number of mobile stations in this case is one larger than in the case where two base stations CS are used, that is, the two TDD frames enable one base station to relay communication data to seven mobile stations.

FIG. 3 is a block diagram showing the main part of a PHS base station 500 for communicating with mobile stations using the two TDD frames shown in FIG. 2.

The base station 500 includes antennas 501 to 504, transmit-receive selecting switches 511 to 514, receiving units 521 to 524, a judging unit 531, a selecting unit 532, HPAs (High Power Amplifiers) 541 and 542, antenna selecting switches 551 and 552, and composition units 561 to 564.

The transmit-receive selecting switches 511 to 514 switch the respective antennas 501 to 504 between transmission and reception in both downstream and upstream time slots in the TDD frames.

The receiving units 521 to 524 have a uniform structure. From input signals received by the antennas 501 to 504, the receiving units 521 to 524 extract modulation signals of two systems having different carrier frequencies allocated to each time slot. The receiving units 521 to 524 also measures the input signal level of each extracted modulation signal, and then output the measured values to the judging unit 531.

The judging unit 531 judges which measured value shows the highest input signal level among the input signal level values of the system 1 measured by the receiving units 521 to 524, and also judges which antenna has given the highest input signal level. The judging unit 531 then outputs the judgement result to the selecting unit 532. At the same time, the judging unit 531 judges which measured value shows the highest input signal level among the input signal level values of the system 2 measured by the receiving units 521 to 524, and also judges which antenna has given the highest input signal level. It then outputs the judgement result to the selecting unit 532.

The selecting unit 532 outputs select signals to the antenna selecting switches 551 and 552 so as to select one of the composition units 561 to 564. The selected composition unit should correspond to the antenna whose highest input signal level determined by the judging unit 531 is higher than the highest input signal levels of other antennas. Here, the two antennas have been determined for each downstream time slot by the judging unit 531 in the previous upstream (reception) time slot in the TDD frames.

The HPA 541 outputs the modulation signal of the system 1 to be transmitted to a mobile station allocated to each time slot of the first TDD frame to the antenna selecting switch 551. The modulation signal has been amplified by the HPA 541 before being outputted.

The HPA 542 outputs the modulation signal of the system 2 to be transmitted to a mobile station allocated to each time slot of the second TDD frame to the transmit-receive selecting switch 552. The modulation signal has been amplified by the HPA 542 before being outputted.

The antenna selecting switch 551 selects one of the four output terminals connected to the composition units 561 to 564 in accordance with the select signals from the selecting unit 532, and then outputs the amplified modulation signal of the system 1 via the selected output terminal.

The antenna selecting switch 552 selects one of the four output terminals connected to the composition units 561 to 564 in accordance with the select signals from the selecting unit 532, and then outputs the amplified modulation signal of the system 2 via the selected output terminal. Thus, the output terminal to be connected to the same composition unit is selected by the antenna selecting switches 551 and 552 in accordance with the select signals from the selecting unit 532.

The composition units 561 to 564 have a uniform structure. When the modulation signals of both system 1 and system 2 are inputted, each of the composition units 561 to 564 combines the two inputs, and then outputs the combined input to the corresponding transmit-receive selecting switch in accordance with the select signals from the selecting unit 532.

The mobile stations communicate with the base station 500 on a carrier frequency of 1916.150 MHz (carrier number 71) using the control channel allocated to #1 slot of the TDD frame so as to register their positions in the waiting state. After the base station 500 allocates each mobile station a communication channel and carrier frequency, each mobile station sets its reception and transmission frequency at the allocated frequency, and performs communication using the allocated communication channel.

With this structure, the base station 500 can relay communication data to up to seven mobile stations within the service area. This base station 500 relays high-quality communication data to the mobile stations by performing reception diversity and transmission diversity using four antennas. Since the base station 500 can relay communication data without adding new elements to the structure of the mobile stations, conventional mobile stations can be used in the PHS.

Since the composition units 561 to 564 have a uniform structure, only the composition unit 561 is described below.

FIG. 4A shows the structure of the composition unit 561. In this figure, the input side of the composition unit 561 is shown on the left side. The composition unit 561 takes the form of branch lines as shown in FIG. 4A. One terminal on the output side in this form is grounded via a terminal resistance of 50Ω which is impedance-matched in the transport path of the modulation signal of each system. The other terminal on the output side in this form is connected to the transmit-receive selecting switch 511.

If the antenna selecting switches 551 and 552 select the composition unit 561, the modulation signal amplified by the HPA 541 (carrier frequency f1) and the modulation signal amplified by the HPA 542 (carrier frequency f2) are inputted to the input terminals corresponding to the antenna selecting switches 551 and 552, respectively.

The outputs of the HPAs 541 and 542 reach the antennas after passing through the antenna selecting switches, the composition units, and the transmit-receive selecting switches. The antenna selecting switches and the transmit-receive selecting switches give resistance to each transport path from the HPAs to the antennas, and the transmission power loss caused by the resistance is 1 dB to 1.5 dB in total in each system. The transmission power loss in each composition unit is even greater. More specifically, as can be seen from the pattern shown in FIG. 4A, input power is divided into the output terminals and grounded terminal in the composition unit 561, and 50% of power is lost on the output side. FIG. 4B shows the power loss in the composition unit 561. In this figure, the axis of abscissas indicates the carrier frequencies of the modulation signals inputted into the composition unit 561, while the axis of ordinate indicates the power ratio of the composition unit 561. As shown in FIG. 4B, the power loss in the composition unit 561 is 3 dB.

As described above, the conventional base station 500 has the problem that a transmission power loss of 4 to 4.5 dB in power ratio, including the loss due to the composition units, switches, and wires, is caused in the transport path from the HPA 541 or 542 to the antennas 501 to 504.

To increase the transmission power of the base station 500 up to 500 mW to meet such a great power loss, the outputs of the HPAs 541 and 542 need to be set twice as large. Since the HPAs are made up of expensive devices having excellent high-frequency characteristics, such as GaAs FET, the production of the base station 500 is costly. The HPAs need to include amplifiers with large radio power.

Each of the composition units 561 to 564 is provided with a HPA in its later stage so as to compensate for the loss caused by the composition units 561 to 564. In such a case, the outputs of the composition units 561 to 564 should be collectively amplified by one linear amplifier, and therefore, an expensive linear amplifier which can amplify modulation signals while keeping excellent linearity over a wide range is necessary, causing the problem that the production of the base station 500 is costly.

Since the high-frequency outputs of the two systems are allocated to one of the four antennas, the circuit structure of the radio system (high-frequency circuits) is complicated, and the wiring is very difficult, because a high-frequency circuit often causes wire coupling, which results in spurious. For those reasons, it has been difficult to make high-frequency circuits compact.

The object of the present invention is to provide a base station for mobile communication systems which can perform a large quantity of simultaneous connection while restraining the rise of cost with a simple structure, and keeping high communication quality.

The other object of the present invention is to provide a base station for mobile communication systems whose wire arrangement is simple, and makes it possible to minimize the circuits, which also reduces the production costs.

SUMMARY OF THE INVENTION

To achieve the above objects, the base station of the present invention comprises a plurality of generating units for generating high-frequency transmission signals, a plurality of antennas, the number of which is larger than the number of the generating units, a switching unit for switching connection of each output terminal of the plurality of generating units from one antenna to another, and a control unit for controlling the switching unit so that the output terminals of the plurality of generating units will be connected to different antennas.

With this structure, the transmission antenna switching can be performed by the switching unit. Since there is no need to provide composition units which are necessary in the prior art, inexpensive devices can be used for the generating units (amplifying units) for outputting transmission signals, reducing the production costs.

The above base station may further comprise a measuring unit for measuring the input signal level of each antenna, a level judging unit for judging which antenna has the highest input signal level among all the antennas for each of the input signals having different frequencies, and an allocating unit for allocating the highest level antenna to a transmission signal corresponding to each input signal.

The control unit may comprise an overlap judging unit for judging whether the antenna selected by the level judging unit is repeatedly allocated to different high-frequency signals, a re-allocating unit for allocating the high-frequency signal having the highest input signal level to an antenna other than the selected antenna in the case where the selected antenna is allocated to two or more high-frequency signals, and a switch control unit for controlling the switching unit in accordance with allocation and re-allocation results.

With this structure, a carrier wave whose highest input signal level is the lowest is allocated to the first antenna, while two carrier waves are prohibited from being transmitted through one antenna. Thus, the transmission diversity can be performed most effectively.

The base station may further comprise a plurality of data output units for outputting transmission data, and an interchanging unit for inputting transmission data from the plurality of data output units interchangeably to the plurality of generating units. Here, the number of the data output units provided is the same as the number of the generating units.

The control unit may collectively control the switching unit and the interchanging unit so that the output terminals of the generating units will be connected to different antennas.

With this structure, the antenna switching is performed using the switching unit for switching high-frequency transmission signals and the interchanging unit for interchanging transmission data at the stage of low-frequency signal. Since there is no need to provide composition units which are necessary in the prior art, high-frequency power loss can be minimized. Thus, inexpensive devices can be used for the generating units (amplifying units) for outputting transmission signals, and the production costs can be reduced. Furthermore, since the number of wires for switching antennas on a high frequency can be reduced by interchanging low-frequency signals, the wire arrangement of the high-frequency circuits can be simpler, and the circuits themselves are smaller.

Each of the generating units may include a first and second generating units.

The switching unit may be provided with a first switching unit for switching connection of the output terminal of the first generating unit from one antenna to another among a predetermined group in the plurality of antennas, and a second switching unit for switching connection of the output terminal of the second generating unit from one antenna to another among the remaining antennas.

With this structure, since the plurality of antennas are divided into two groups corresponding to the first and second generating units, the number of wires on a high frequency can be reduced further. Here, circuit coupling on a high frequency can also be reduced, and the design and production of the circuits can be easier and smaller.

The switching unit may further comprise a third switching unit for bypass-connecting the output terminal of the second generating unit to one of the antennas on the first switching unit side, and the output terminal of the first generating unit to one of the antennas on the second switching unit side.

With this structure, although the antennas are divided into two groups, the number of antennas to be selected for each transmission signal by bypass connection will not be reduced.

The first and second generating units each may include a PLL unit for generating local frequency signals to determine the frequency of each transmission signal. The control unit may control the local frequencies of the PLL unit so as to interchange the carrier frequencies of the first and second generating units when cross-connecting the interchanging unit.

With this structure, it is easy to interchange transmission data as well as carrier frequencies.

The base station of the present invention is also used in a mobile communication system performing diversity as well as transmission and reception by time-division bidirectional multiplex using synchronized time-division frames on two carrier waves. Here, the base station comprises four antennas, first and second generating units for generating high-frequency transmission signals each having a PLL unit for generating local frequency signals to determine the carrier frequency of each transmission signal, a first switching unit for switching connection of the output terminal of the first generating unit between predetermined two of the four antennas, a second switching unit for switching connection of the output terminal of the second generating unit between the remaining two antennas, a third switching unit for bypass-connecting the output terminal of the second generating unit to one of the antennas on the first switching unit side and the output terminal of the first generating unit to one of the antennas on the second switching unit side, first and second data output units for outputting transmission data, an interchanging unit for inputting the transmission data from the first and second data output units interchangeably to the first and second generating units, and a control unit for controlling the first, second, and third switching units, and the interchanging unit so that the output terminals of the generating units will be connected to different antennas, and for controlling the PLL unit so as to interchange the carrier frequencies of the first and second generating units when cross-connecting the interchanging unit.

With this structure, the antenna switching is performed using the switching unit for switching high-frequency transmission signals and the interchanging unit for interchanging transmission data in the stage of low-frequency signals. Since there is no need to provide composition units which are necessary in the prior art, high-frequency power loss can be reduced. Thus, inexpensive devices can be used for the generating units (amplifying units) for outputting transmission signals, reducing production costs. Since circuit coupling on a high frequency can also be reduced, the design and production of the circuits can be easier and smaller.

The first switching unit may include a first selecting switch having an input terminal to which the output terminal of the first generating unit is connected, the same number of output terminals as the antennas of the predetermined group, and a bypass output terminal, and transmit-receive selecting circulators for connecting the output terminals of the first selecting switch to the antennas of the predetermined group. The second switching unit may include a second selecting switch having an input terminal to which the output terminal of the second generating unit is connected, the same number of output terminals as the remaining antennas, and a bypass output terminal, and transmit-receive selecting circulators for connecting the output terminals of the second selecting switch to the remaining antennas.

The third switching unit may include a first bypass line for connecting the bypass output terminal of the first selecting switch to one of the circulators of the second switching unit, and a second bypass line for connecting the bypass output terminals of the second selecting switch to one of the circulators of the first switching unit.

The control unit may control bypass connection by open- or short-circuiting one port of each circulator to which the first and second bypass lines are connected so as to cause power total reflection.

With this structure, switching and bypassing can be performed on a high frequency using circulators which are passive devices causing little power loss.

The base station further comprises a measuring unit for measuring the level of an input signal corresponding to each transmission signal for each antenna, and level judging unit for judging which antenna has the highest input signal level for each carrier wave.

The control unit may include an allocating unit for allocating an antenna which has been judged to have the highest input signal level for each carrier wave, an overlap judging unit for judging whether the same antenna is allocated to different carrier waves, a re-allocating unit for allocating another antenna to the carrier wave that has the highest input signal level in the case where the same antenna is allocated to different carrier waves, and a switch control unit for controlling the switching unit in accordance with allocation and re-allocation results.

With this structure, a carrier wave whose highest input signal level is the lowest is allocated to the first antenna, while two carrier waves are prohibited from being transmitted through one antenna. Thus, the transmission diversity can be performed most effectively.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 7 shows the selection control logic of the selecting unit with respect to each switch in the transmission time slots.

FIG. 10 shows the selection control logic of the selecting unit with respect to each switch in the transmission time slots.

FIG. 12 shows the selection control logic of the selecting unit with respect to each switch in the transmission time slots.

FIG. 16 shows the selection control logic of the control unit with respect to each switch in the transmission time slots.

FIG. 22 shows the selection control logic of the control unit with respect to each switch in the transmission and reception time slots.

FIGS. 24A to 24M each shows signal routes.

FIG. 25 shows example input signal levels of three systems with respect to four antennas and example judgements of the judging unit.

FIG. 26 shows the correspondence between the antennas and the three systems.

PREFERRED EMBODIMENTS OF THE INVENTION

[First Embodiment]

Figure 5:
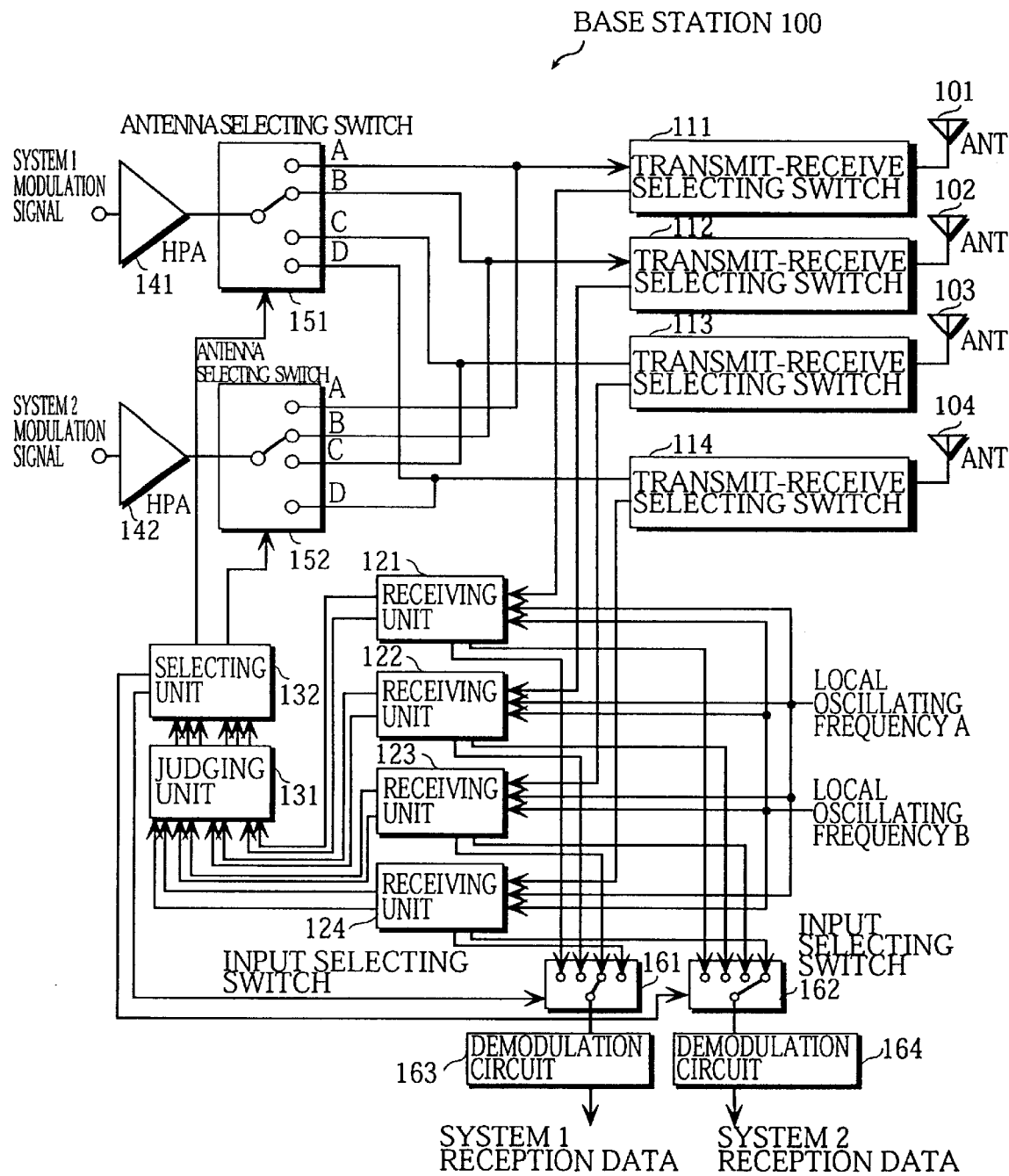
FIG. 5 is a circuit block diagram of the main part of the base station of the first embodiment.

FIG. 5 is a block diagram showing a part of the structure of a base station 100 for PHS of the first embodiment of the present invention.

The base station 100 includes antennas 101 to 104, transmit-receive selecting switches 111 to 114, receiving units 121 to 124, a judging unit 131, a selecting unit 132, HPAs 141 and 142, antenna selecting switches 151 and 152, input selecting switches 161 and 162, demodulator circuits 163 and 164.

Figure 2:
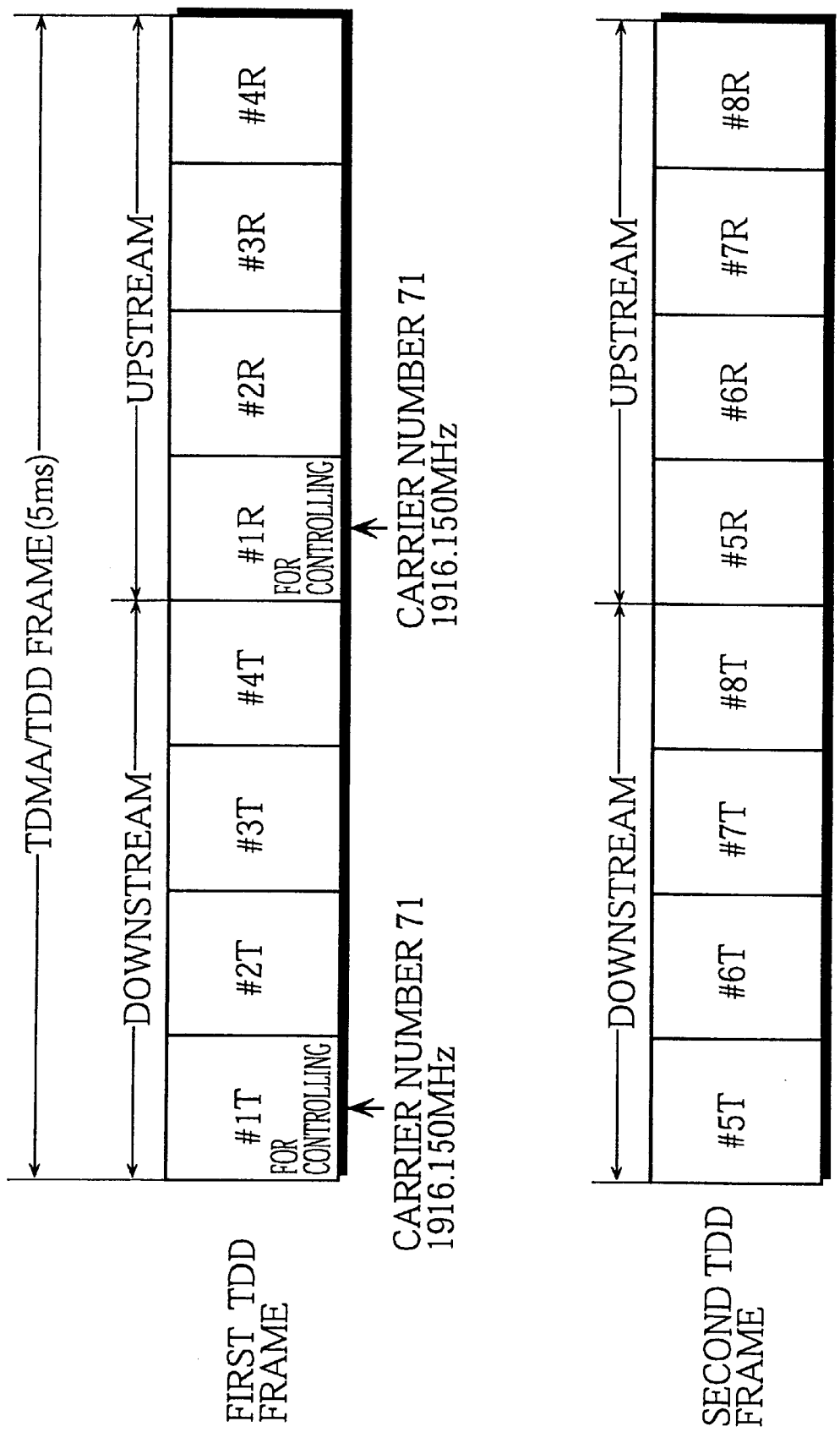
FIG. 2 shows channel allocation in each TDD frame on the base station side in the case where two TDD frames whose corresponding time slots have different carrier frequencies are simultaneously used.
Figure 3:
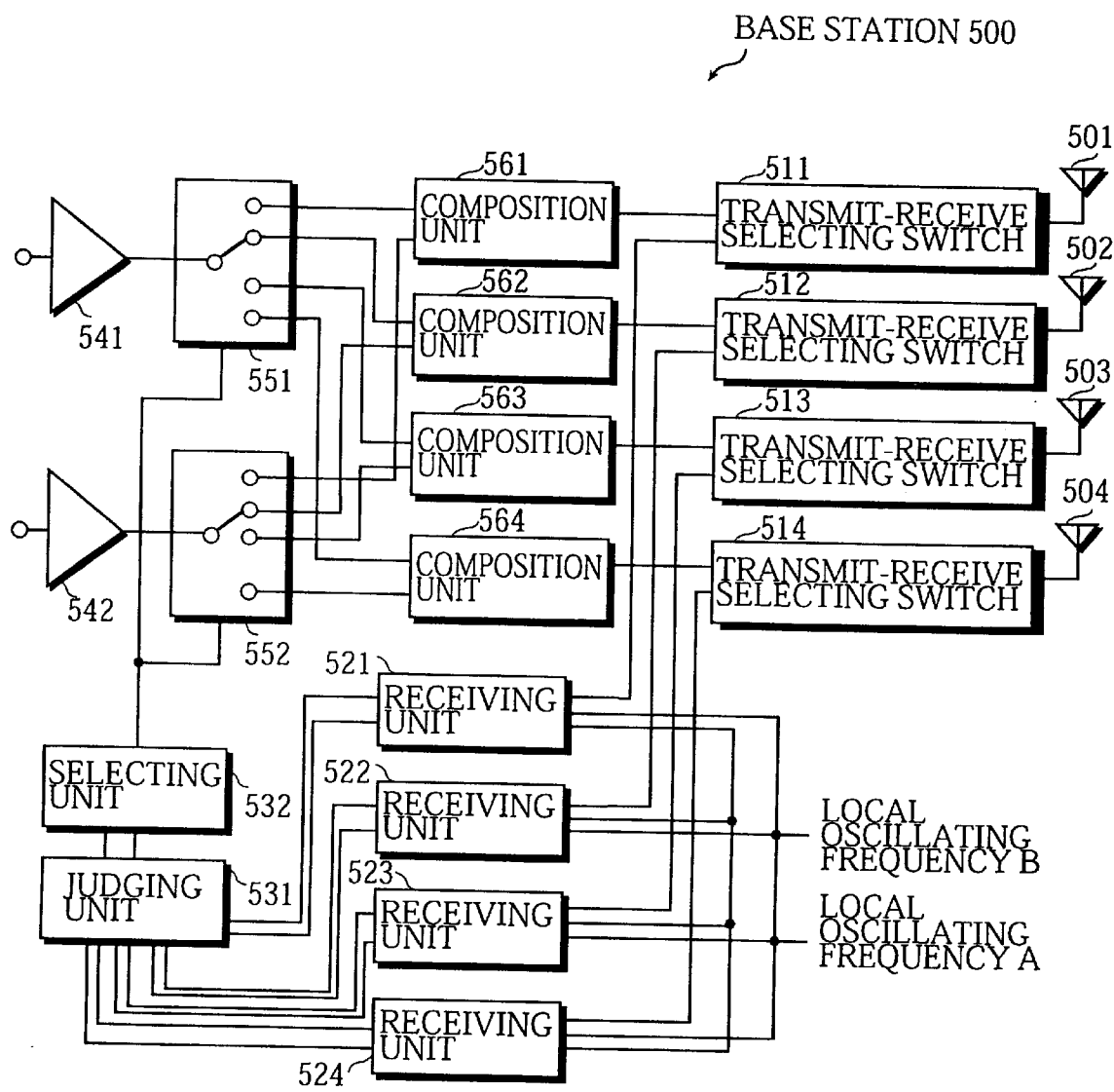
FIG. 3 is a block diagram showing the main part of a PHS base station for communicating with mobile stations using the two TDD frames shown in FIG. 2.
Figure 4A:
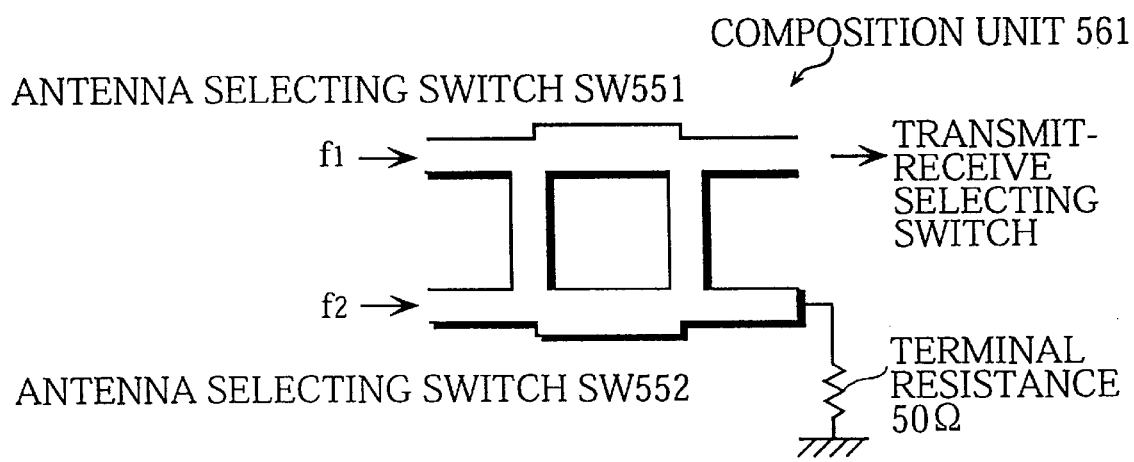
FIG. 4A shows the structure of a composition unit in detail.
Figure 4B:
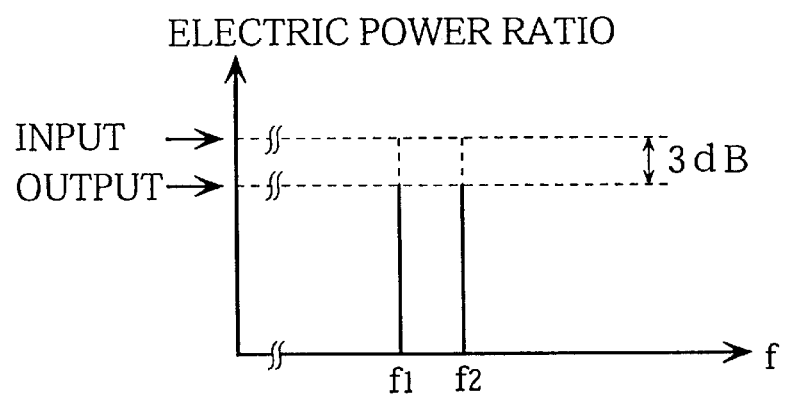
FIG. 4B shows the power loss characteristics of the composition unit.

Like the base station 500, the base station 100 uses two TDD frames shown in FIG. 2 at the same time, so as to relay the communication to seven mobile stations.

Like the transmit-receive selecting switches 511 to 514, the transmit-receive selecting switches 111 to 114 switch the antennas 101 to 104, respectively, between transmission and reception.

Since the receiving units 121 to 124 all have the same structure, the following description mainly concerns the receiving unit 121.

An input signal received by the antenna 101 is inputted into the receiving unit 121 via the transmit-receive selecting switch 111. An input signal received by the antenna 102 is inputted into the receiving unit 122 via the transmit-receive selecting switch 112. An input signal received by the antenna 103 is inputted into the receiving unit 123 via the transmit-receive selecting switch 113. An input signal received by the antenna 104 is inputted into the receiving unit 124 via the transmit-receive selecting switch 114.

The receiving unit 121 extracts a modulation signal of system 1 from the input signal, measures the input signal level of the extracted modulation signal of the system 1, and then outputs the measured value to the judging unit 131. The receiving unit 121 also extracts a modulation signal of system 2, measures the input signal level of the extracted modulation signal of the system 2, and then outputs the measured value to the judging unit 131.

The receiving unit 121 outputs the modulation signal of the system 1 to a corresponding input terminal of the input selecting switch 161. At the same time, the receiving unit 121 outputs the modulation signal of the system 2 to a corresponding input terminal of the input selecting switch 162.

The judging unit 131 and the selecting unit 132 operate when the microcomputer constituting these units inside the base station 100 executes a software program.

The judging unit 131 determines, in each time slot, the highest input signal level and the second highest input signal level among the measured input signal levels of the modulation signal of the system 1 inputted from the receiving units 121 to 124. The judging unit 131 then determines which antenna has the highest level input signal (the first antenna) and which antenna has the second highest level input signal (the second antenna). The judging unit 131 then outputs the set of the highest input signal level and the first antenna, and the second antenna to the selecting unit 132. The judging unit 131 also determines, in each time slot, the highest input signal level and the second highest input signal level among the measured input signal levels of the system 2 modulation signals inputted from the receiving units 121 to 124, and then judges which antenna has the highest level input signal (the first antenna) and which antenna has the second highest level input signal (the second antenna).

The selecting unit 132 outputs a select signal to the input selecting switch 161 according to the judgement of the judging unit 131 in each upstream time slot, so that the modulation signal of the system 1 corresponding to the first antenna will be selected. At the same time, the selecting unit 132 outputs a select signal to the input selecting switch 162 so that the modulation signal of the system 2 corresponding to the first antenna will be selected.

In each downstream (transmission) time slot, the selecting unit 132 also judges whether the two first antennas judged in the previous upstream time slot corresponding to the present time slot are the same.

If they are not the same, the selecting unit 132 outputs a select signal to the antenna selecting switch 151 so that an input terminal corresponding to the first antenna determined from the modulation signal of the system 1 will be selected. At the same time, the selecting unit 132 outputs a select signal to the antenna selecting switch 152 so that an input antenna corresponding to the first antenna determined from the modulation signal of the system 2 will be selected.

If the two first antennas are the same, the highest input signal level of the modulation signal of the system 1 is compared with the highest input signal level of the modulation signal of the system 2. According to the comparison result, the selecting unit 132 outputs a select signal to the antenna selecting switch 152 so that the second antenna will be selected for the system whose highest input signal level is higher than the other, and that the first antenna will be selected for the other system.

The HPA 141 amplifies the modulation signal of the system 1 to be transmitted through the downstream time slot in the first TDD frame.

The HPA 142 amplifies the modulation signal of the system 2 to be transmitted through the downstream time slot in the second TDD frame.

The antenna selecting switch 151 selects an output terminal in accordance with a select signal sent from the selecting unit 132, and outputs the amplified modulation signal of the system 1 to the selected antenna.

The antenna selecting switch 152 selects an output terminal in accordance with a select signal sent from the selecting unit 132, and outputs the amplified modulation signal of the system 2 to the selected antenna.

The input selecting switch 161 has four input terminals each having a modulation signal of the system 1 extracted from each of the receiving units 121 to 124. It selects one of the input terminals in accordance with a select signal sent from the selecting unit 132, and outputs the selected input to the demodulator circuit 163.

The input selecting switch 162 also has four input terminals each having a modulation signal of the system 2 extracted from each of the receiving units 121 to 124. It selects one of the input terminals in accordance with a select signal sent from the selecting unit 132, and outputs the selected input to the demodulator circuit 164.

The demodulator circuit 163 demodulates the modulation signal of the system 1 selected by the input selecting switch 161.

The demodulator circuit 164 demodulates the modulation signal of the system 2 selected by the input selecting switch 162.

(Structure of the Receiving Units 121 to 124)

Figure 6:
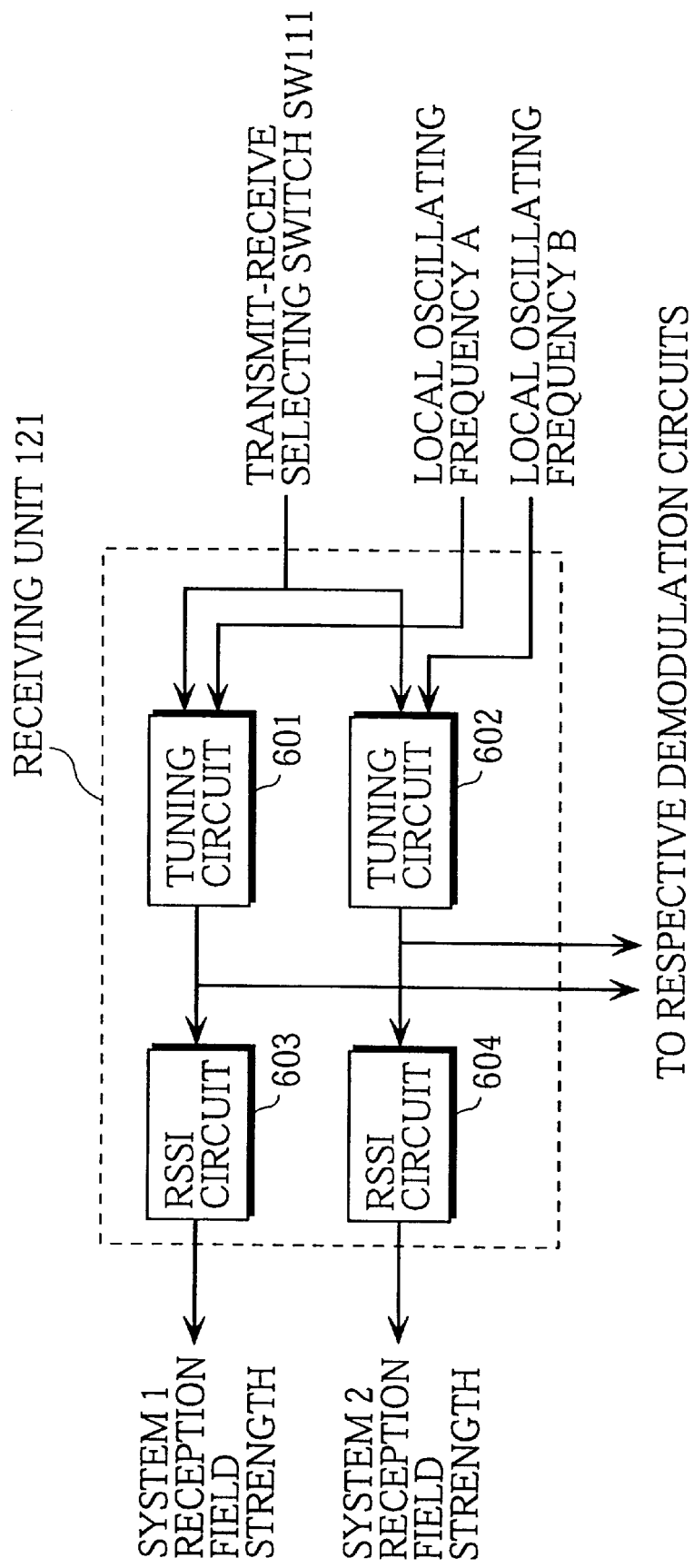
FIG. 6 is a block diagram showing the structure of a receiving unit 521 in detail.

FIG. 6 is a block diagram showing the structure of the receiving unit 121 in detail.

Since the receiving units 121 to 124 all have the same structure, the following description mainly concerns the structure of the receiving unit 121 in detail and the process performed by it, while no explanation of other receiving units 122 to 124 is provided.

The receiving unit 121 comprises tuning circuits 601 and 602, and RSSI circuits 603 and 604.

The tuning circuit 601 sets a local oscillating frequency A for a local oscillator (not shown) in each upstream time slot, in accordance with the input from a reception control unit (not shown) in the base station 100. The setting of the local oscillating frequency A is conducted by setting a predetermined number for the dividing number of the programmable divider of the PLL in the local oscillator of the tuning circuit 601. By doing so, the tuning circuit 601 is able to synchronize with a carrier frequency allocated to each upstream time slot in the first TDD frame, and to extract a modulation signal of a mobile station allocated to each time slot in the first TDD frame from an input signal received by the antenna 101. Hereinafter, modulation signals transmitted and received through each time slot in the first TDD will be referred to as "system 1".

The tuning circuit 602 has the same structure as the tuning circuit 601, and sets a local oscillating frequency B of a built-in local oscillator (not shown) in accordance with input from the reception control unit (not shown) in the base station. By doing so, the tuning circuit 602 is able to extract a modulation signal of a mobile station allocated to each time slot in the second TDD frame from an input signal received by the antenna 101. Hereinafter, modulation signals transmitted and received through each time slot in the second TDD will be referred to as "system 2".

Although the input from the transmit-receive selecting switch 111 is shown as if to be divided directly into the two tuning circuits 601 and 602 in FIG. 6 for ease of explanation, a divider is used to divide the input into the tuning circuits 601 and 602.

The RSSI circuit 603 measures the input signal level of a modulation signal of the system 1 extracted by the tuning circuit 601, and then outputs it to the judging unit 131.

The RSSI circuit 604 measures the input signal level of a modulation signal of the system 2 extracted by the tuning circuit 602, and then outputs it to the judging unit 131.

Among the modulation signals of the system 1 extracted by the tuning circuit 601 of each of the receiving units 121 to 124, one corresponding to the antenna provided with the highest input signal level is selected by the input selecting switch 161, and outputted to the demodulator circuit 163. The modulation signals of the system 2 extracted by the tuning circuit 602 are processed in the same manner. Thus, input signals of the system 1 and system 2 are independently subjected to diversity reception using four antennas.

(Switch Setting in Transmission by the Selecting Unit 132)

FIG. 7 shows the selection control logic of the selecting unit 132 with respect to the antenna selecting switches 151 and 152 in each transmission time slot.

The column of "ANTENNA SELECTION" in the figure shows the selection results of the transmission antenna of the system 1 and system 2, respectively. Here, the combination of the same antennas is excluded. The column of "ANTENNA SELECTING SWITCH SETTING" shows the control logic of the selecting unit 132 with respect to the antenna selecting switches 151 and 152, that is, the selection content of the select signal outputted from the selecting unit 132 to each antenna selecting switch. The output terminals of the antenna selecting switches 151 and 152 are classified into four types indicated by alphabets A to D in the figure. For instance, if the selection result of the selecting unit 132 in a reception time slot allocates the antenna 101 to the system 1, and the antenna 102 to the system 2, the selecting unit 132 outputs a select signal in the following transmission time slot, so that the antenna selecting switch 151 will be connected to the output terminal A, and that the antenna selecting switch 152 will be connected to the output terminal B.

(Antenna Selection by the Selecting Unit 132)

Figure 8:
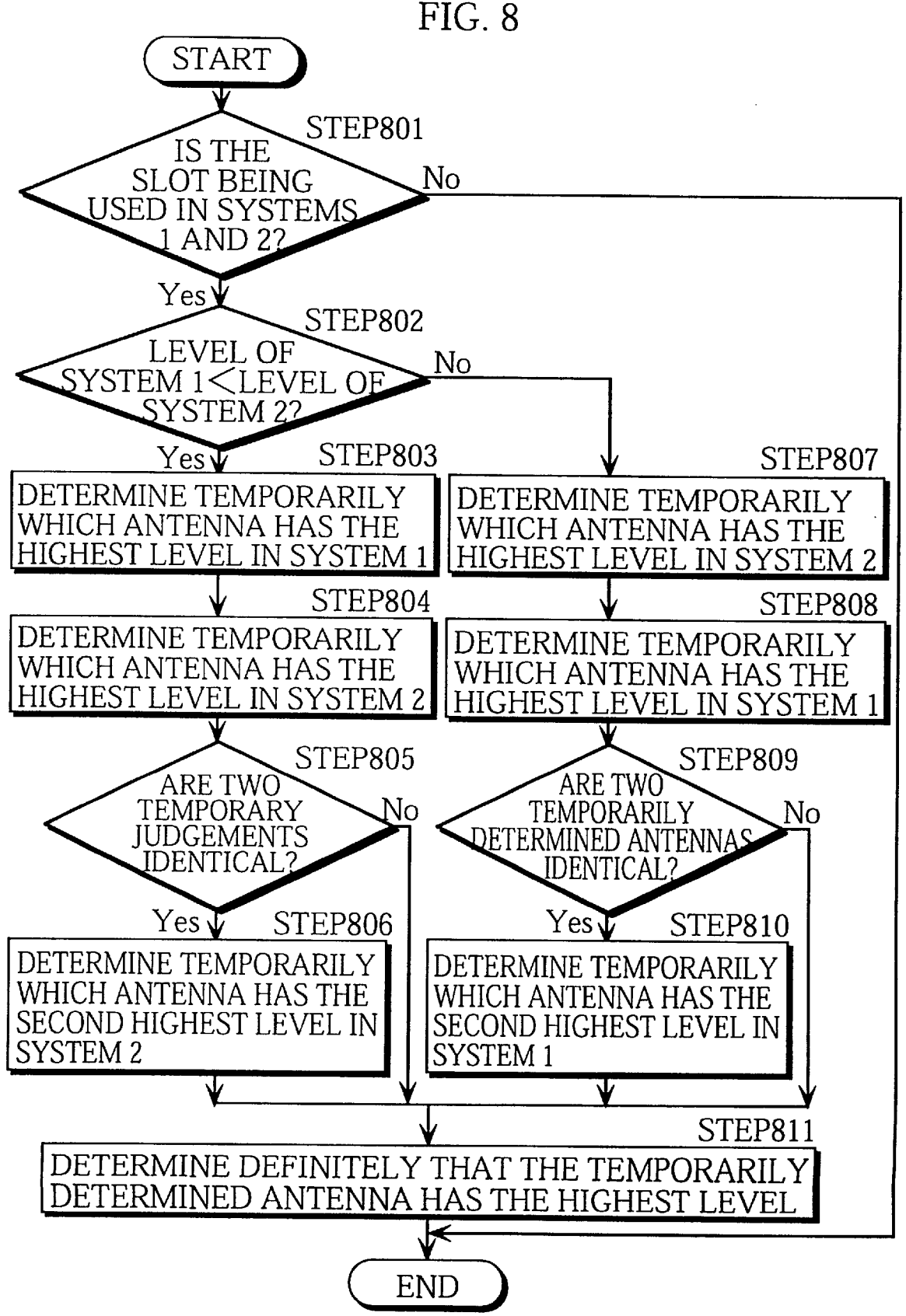
FIG. 8 is a flowchart showing the antenna selecting process for the system 1 and system 2 performed by the selecting unit.

FIG. 8 is a flowchart showing antenna selection ("ANTENNA SELECTION" shown in FIG. 7) in each downstream time slot of the system 1 and system 2.

The selecting unit 132 receives the judgement of the judging unit 131 in the reception time slot, determines a corresponding transmission antenna of each system for the following transmission time slot, and selects the transmission antenna determined for each system in the transmission time slot.

If the present time slot is used in both the system 1 and system 2 (step 801), the judging unit 131 compares the highest input signal level in the system 1 with the highest input signal level in the system 2 (step 802).

If the highest input signal level in the system 1 is lower than the highest input signal level in the system 2, the antenna that has the highest input signal level in the system 1 is temporarily determined as the next transmission antenna for the system 1 (step 803), and the antenna that has the highest input signal level in the system 2 is also temporarily determined as the next transmission antenna for the system 2 (step 804). If the temporarily determined transmission antennas are identical in the system 1 and system 2 (step 805), priority is given to the system 1 whose highest input signal level is lower, and therefore, the transmission antenna for the system 2 is changed, that is, one antenna other than the temporarily determined antenna for the system 1 (second antenna) is determined as the transmission antenna for the system 2 (step 806).

If the highest input signal level in the system 1 is not lower than in the system 2, the transmission antenna is determined in the same manner (steps 807 to 810).

The selecting unit 132 then definitely determines the temporarily determined antennas for the system 1 and system 2 as the transmission antennas for the next transmission time slot (step 811).

As described above, different antennas are determined for the system 1 and system 2, respectively, in each time slot. In the time slot following the reception time slot, the selecting unit 132 controls the antenna selecting switches 151 and 152 so as to select and transmit the antennas for the system 1 and system 2 in accordance with the determined results. Accordingly, the transmission wave of the system 1 and system 2 are outputted from different antennas.

The following is a description of the operation of the base station 100 in the first embodiment having the structure described above.

At the base station 100, the selecting unit 132 judges whether the first antennas for the system 1 and system 2 determined in the previous reception time slot are identical or not. If they are, the highest input signal level of the modulation signal of the system 1 is compared with the highest input signal level of the modulation signal of the system 2. The second antenna is allocated to the higher level system, and the first antenna is allocated to the lower level system. In accordance with the selection, the selecting unit 132 outputs select signals to the antenna selecting switches 151 and 152, as shown in FIG. 7. Accordingly, the outputs of the HPAs 141 and 142 are transmitted from different antennas.

At the base station 100, the modulation signals of the two systems having different carrier frequencies can be simultaneously transmitted by way of transmission diversity.

With the base station of this structure, there is no need to use the composition units 561 to 564 provided between the antenna selecting switches 551 and 552 and the transmit-receive selecting switches 511 to 514 in the conventional base station 500. As a result, the power loss of about 3 dB caused by the composition units 561 to 564 can be prevented. Accordingly, the outputs of the HPAs 141 and 142 do not require a transmission level as high as the outputs of the HPAs 541 and 542. Because of this fact, the HPAs 141 and 142 can comprise devices of lower transmission level than the HPAs 541 and 542. The lower the transmission level of the devices, the lower the price. Thus, the base station 100 does not need to include the composition units 561 to 564, and can be made compact.

In the above embodiment, the HPAs 141 and 142 are provided just before the antenna selecting switches 151 and 152, respectively. However, HPAs does not necessarily have to be provided before antenna selecting switches, and they may be situated after the antenna selecting switches. In such a case, the number of HPAs is larger, but the power loss of about 3 dB to be caused by the composition units 561 to 564 can be prevented, and the transmission level of the devices can be lower. Furthermore, since the modulation signals can be amplified more efficiently than in the case of amplifying before the antenna selecting switches, devices of lower transmission level can be used for each HPA. More detailed explanation is provided in the third embodiment referring to FIG. 11.

Like the conventional base station 500, the base station 100 can communicate with up to seven mobile stations in a service area, and the transmission from each mobile station can be received correctly by means of reception diversity using four antennas. Since the base station 100 communicates with the mobile stations without adding any element to the structure of each mobile station, the conventional mobile stations can be used along with the base station of the mobile communication system of the present invention. Accordingly, in the mobile communication system of the present invention, the conventional base station 500 can be employed as well as the base station 100, where appropriate.

Thus, more efficient and less expensive base stations for the mobile communication systems can be achieved. Furthermore, the base station 100 can reduce power loss with a simpler structure, and realizes less expensive transmission unit as well as transmission diversity of modulation signals of two systems using four antennas. By doing so, the transmission to the mobile stations within the service area can be performed properly, and the base station 100 of this embodiment can provide a high grade radio communication service in which simultaneous connection processing can be performed by only one base station in larger quantity.

If the first antennas for both modulation signals of the system 1 and system 2 are identical in each TDD frame used in transmission diversity, the selecting unit 132 of this embodiment allocates the first antenna the modulation signal whose highest input signal level is the lowest among the modulation signals related to the first antenna. Here, "allocate" means that the selecting unit 132 outputs select signals to the antenna selecting switches in the downstream time slot following the judgement, so that the modulation signal will be transmitted from the antenna. This also applies to the following description. The selecting unit 132 allocates the modulation signal whose highest input signal level is the second lowest among the modulation signals to the second antenna of the modulation signal. If the second antenna is identical to the first antenna determined for a modulation signal of the other system, the selecting unit 132 allocates the lower input signal level modulation signal to the antenna. Thus, in the case where modulation signals of different systems are judged to be identical, the selecting unit 132 allocates the modulation signal whose input signal level is lower than the other to the antenna, and the modulation signal whose input signal level is higher than the other to a lower level antenna.

[Second Embodiment]

Figure 9:
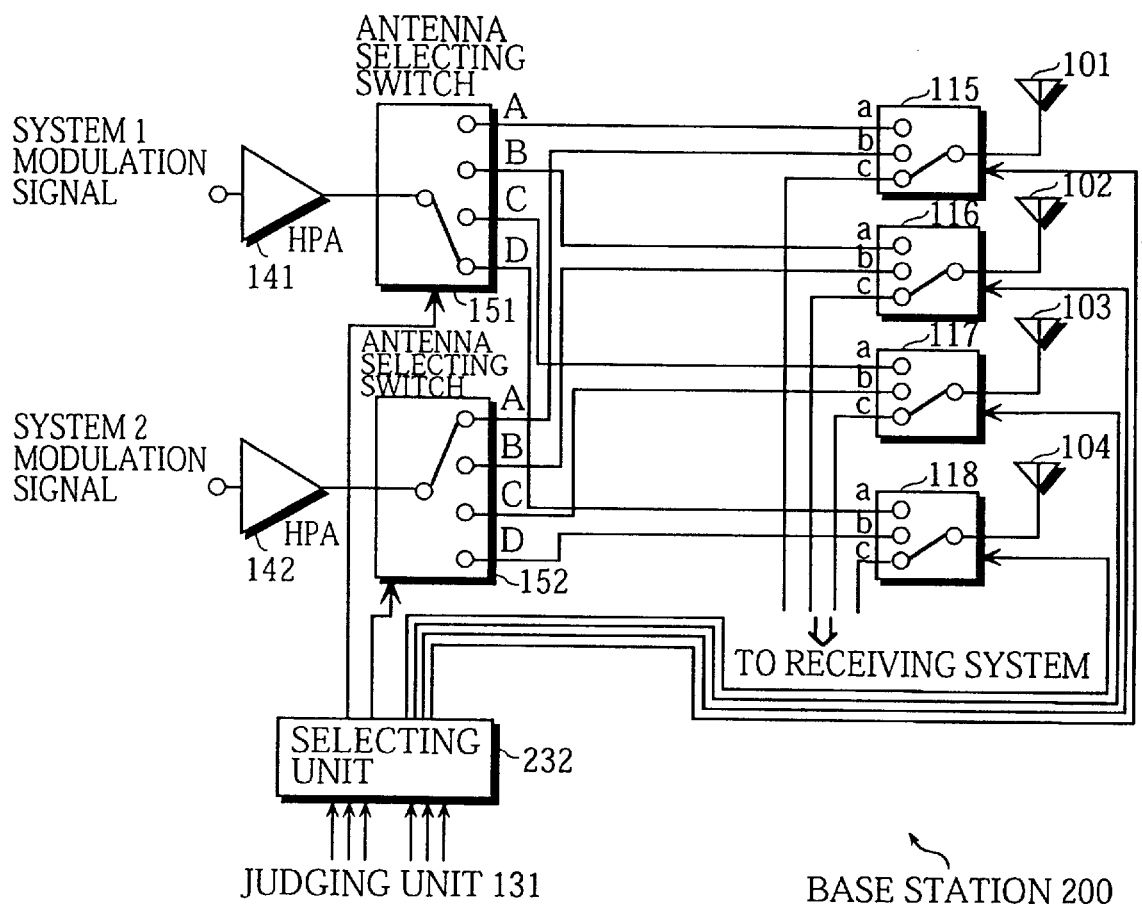
FIG. 9 is a circuit block diagram showing the main part of the base station of the second embodiment.

FIG. 9 is a block diagram showing the main parts of a base station 200 of the second embodiment of the present invention. The same circuits as the receiving units, the input selecting switches, the demodulator circuits, and the judging unit of the base station 100 shown in FIG. 5 are not shown in this figure. The following description does not include any explanation of the same aspects as in FIG. 5.

The characteristics of the second embodiment are as follows. In the first embodiment, the output terminals of the antenna selecting switches 151 and 152 are connected to each other in each system, and then connected to the switching terminals of the transmit-receive selecting switches 111 to 114, as shown in FIG. 5. In the second embodiment, however, the output terminals of the antenna selecting switches 151 and 152 are not connected to each other, but separately connected to the switching terminals of the transmit-receive selecting switches 115 to 118. A selecting unit 232 is provided in place of the selecting unit 132.

To achieve the connections between the transmission system and the antennas as in the first embodiment, three-port selecting switches are employed in place of the transmit-receive switches 115 to 118 as shown in FIG. 9. The output terminals of the antenna selecting switches 151 and 152 are connected to two of the three ports of each three-port selecting switches. The remaining one Port is connected to the reception system. The three-port transmit-receive selecting switches 115 to 118 are switched by signals from the selecting unit 232.

FIG. 10 shows the selection control logic of the selecting unit 232 with respect to the antenna selecting switches 151 and 152, and the switches 115 to 118 in each transmission time slot.

Explanations of the same aspects as the first embodiment shown in FIG. 7 is not provided in the description below. Instead, the following description concerns the particular aspects of this embodiment.

In the column of "ANTENNA SELECTING SWITCH SETTING" in FIG. 10, the control logic of the selecting unit 232 with respect to the antenna selecting switches 151 and 152, and the transmit-receive selecting switches 115 to 118. In FIG. 10, alphabetical characters a to c indicate the terminals of the transmit-receive selecting switch shown in FIG. 9. The terminals a and b are used for switching transmission antennas in the transmission time slots, while the terminal c is connected in the reception time slots. The selecting unit 232 outputs a select signal so as to connect each switch as shown in the figure.

The base station 200 structured as above has the following advantages over the base station 100 of the first embodiment. Since the output terminals of the antenna selecting switches 151 and 152 of the base station 100 are connected to each other, the antenna selecting switches need to have a high isolation so that the isolation (degree in reducing leakage power) in the transmission system will increase. Because of this isolation, it is difficult to keep conformity between the antenna selecting switches 151 and 152, and the transmit-receive selecting switches 111 to 114.

Meanwhile, the base station 200 shown in FIG. 9 exhibits great isolation between the systems, because the transmit-receive selecting switches 115 to 118 are connected between the antenna selecting switches 151 and 152, and the antennas 101 to 104. Since isolation is not a very important factor in this case, the design of the base station can be simpler. It is also easier to keep the conformity than in the base station 100.

[Third Embodiment]

Figure 11:
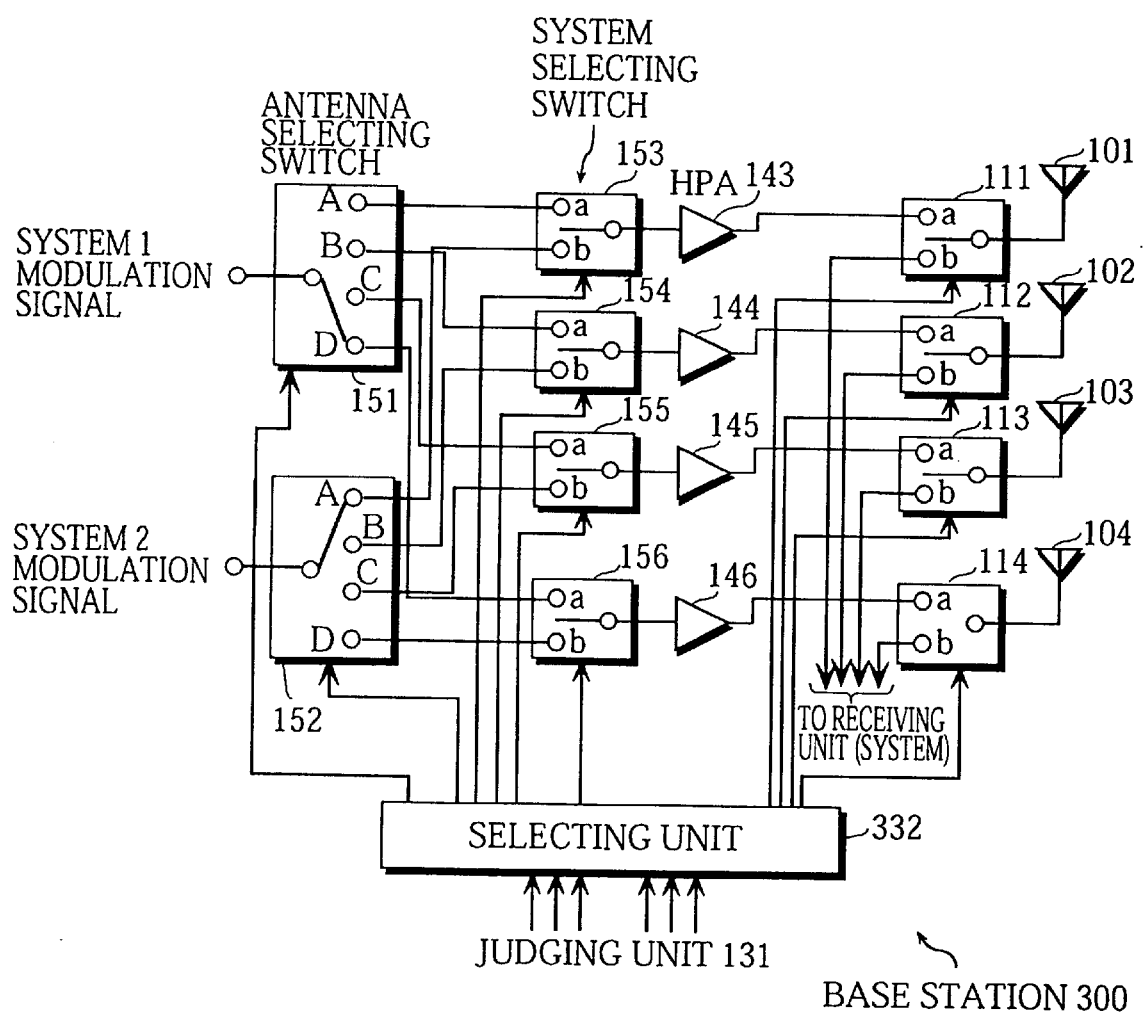
FIG. 11 is a circuit block diagram showing the main part of the base station of the third embodiment.

FIG. 11 is a circuit block diagram showing the main parts of a base station 300 of the third embodiment of the present invention. The same circuits as in the base station 100 shown in FIG. 5, i.e., the receiving units, the input selecting switches, the demodulator circuits, and the judging unit, are not shown in this figure. The following description mainly concerns the characteristic aspects of this embodiment.

In the base station 100, the two HPAs 141 and 142, the antenna selecting switches 151 and 152, and the four transmit-receive selecting switches 111 to 114 are arranged in that order in the direction of the signal flow in the transmission system, as shown in FIG. 5. In the base station 300 of this embodiment, however, two antenna selecting switches 151 and 152, four HPAs 143 to 146, and four transmit-receive selecting switches 11 to 114 are arranged in that order, as shown in FIG. 11. In this embodiment, system selecting switches 153 to 156 are further provided between the two antenna selecting switches 151 and 152, and the four HPAs 143 to 146. A selecting unit 332 is provided in place of the selecting unit 132. The system selecting switches 153 to 156 are provided for improving the isolation in the transmission system.

Switching control over the antenna selecting switches 151 and 152, the system selecting switches 153 to 156, and the transmit-receive selecting switches 111 to 114, is performed by the selecting unit 332.

FIG. 12 shows the selection control logic of the selecting unit 332 with respect to those switches in each transmission time slot.

In the columns of "ANTENNA SELECTION" and "SETTING OF ANTENNA SELECTING SWITCH AND CROSS SWITCH" in FIG. 12, the contents are shown in the same form as in FIG. 10. FIG. 12 shows the content of each select signal transmitted from the selecting unit 332 to the antenna selecting switches 151 and 152, the system selecting switches 153 to 156, and the transmit-receive selecting switches. The transmit-receive selecting switches 111 to 114 are all connected to the receiving units via the terminal b.

By doing so, the antenna selecting switches 151 and 152 select one of the antennas 101 to 104 in accordance with the select signals sent from the selecting unit 332, and the system selecting switches 153 to 156 select one of the two output systems of the antenna selecting switches 151 to 152. The transmitted signals are amplified by one of the four HPAs 143 to 146 and radio-transmitted via the transmit-receive selecting switches 111 to 114, and the antennas 101 to 104.

Figure 13:
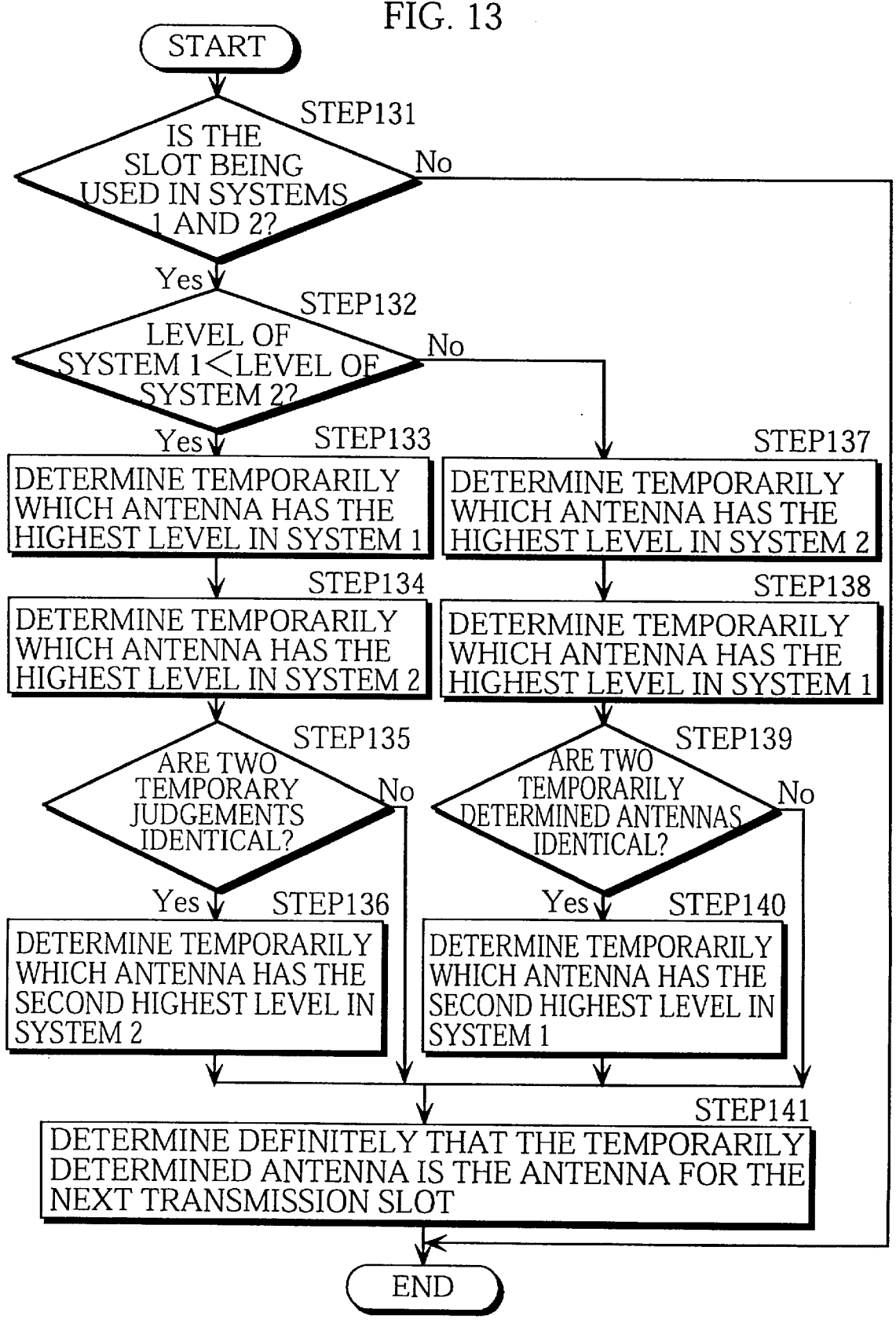
FIG. 13 is a flowchart showing the antenna selecting process for the system 1 and system 2 performed by the selecting unit.

FIG. 13 is a flowchart showing the antenna selection process for each downstream time slot for the system 1 and system 2, that is, the "ANTENNA SELECTION" process shown in FIG. 12.

Referring to this flowchart, only the different aspects from the flowchart of FIG. 8 are described below. The different aspects include the switch control by the selecting unit 332 in the transmission time slot as shown in FIG. 12 (step 141). Thus, radio transmission is conducted using a different transmission antenna selected by each switch for each system.

It is preferable to control the switches in each transmission time slot, so that electric power will be supplied only to the HPAs connected to the system selecting switches 153 to 156. In such a case, the selecting unit 332 controls the power source of the HPAs in line with the system selecting switches 153 to 156. By doing so, the power used can be reduced.

The structure of the base station 300 of the third embodiment has the following advantages over the first and second embodiments. With the base station 300, the electric loss of the later stage of each of the HPAs 143 to 146 is smaller than in the first and second embodiments, so that low performance HPAs can be employed (in amplifying low noise). As the outputs of the HPAs are lower, less power is used in this embodiment in comparison with the first and second embodiments. Since the radio wave outputted from each of the antennas 101 to 104 is predetermined and only the transmit-receive selecting switches 111 to 114 are provided just before the antennas, only the amount of power loss should be taken into consideration in the HPAs 143 to 146. Thus, a low performance amplifier can be used for a HPA. Meanwhile, a high performance amplifier can increase the efficiency of the HPA by controlling amplification.

If the HPAs are arranged in the first stage as in the first and second embodiments, high performance and efficient HPAs are required, because the amount of electric power outputted from the antennas and the amount of electric power reduced in the circuits should be considered in determining the performance and efficiency of the HPAs. In the third embodiment, however, the HPAs do not need to have high performance and efficiency, because one HPA is provided for one antenna.

Furthermore, since the HPAs perform amplification after antenna selection, the third embodiment has the advantage, coupled with the system selecting switches 153 to 156, in that the better isolation between the transmission systems can be achieved.

[Fourth Embodiment]

Figure 14:
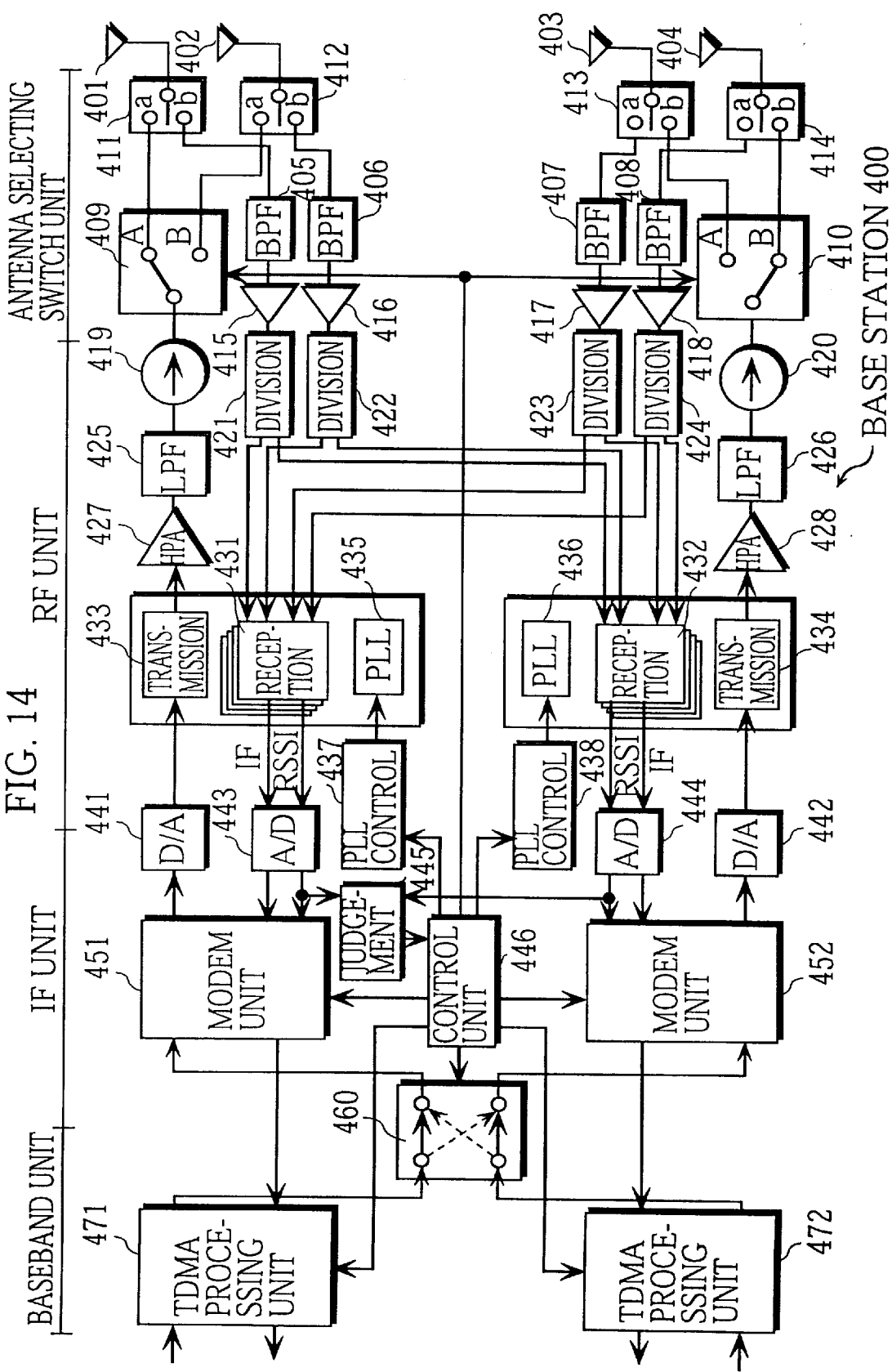
FIG. 14 is a circuit block diagram showing the main part of the base station of the fourth embodiment.

FIG. 14 is a block diagram showing the main parts of the structure of a base station 400 of the fourth embodiment of the present invention.

Figure 1:
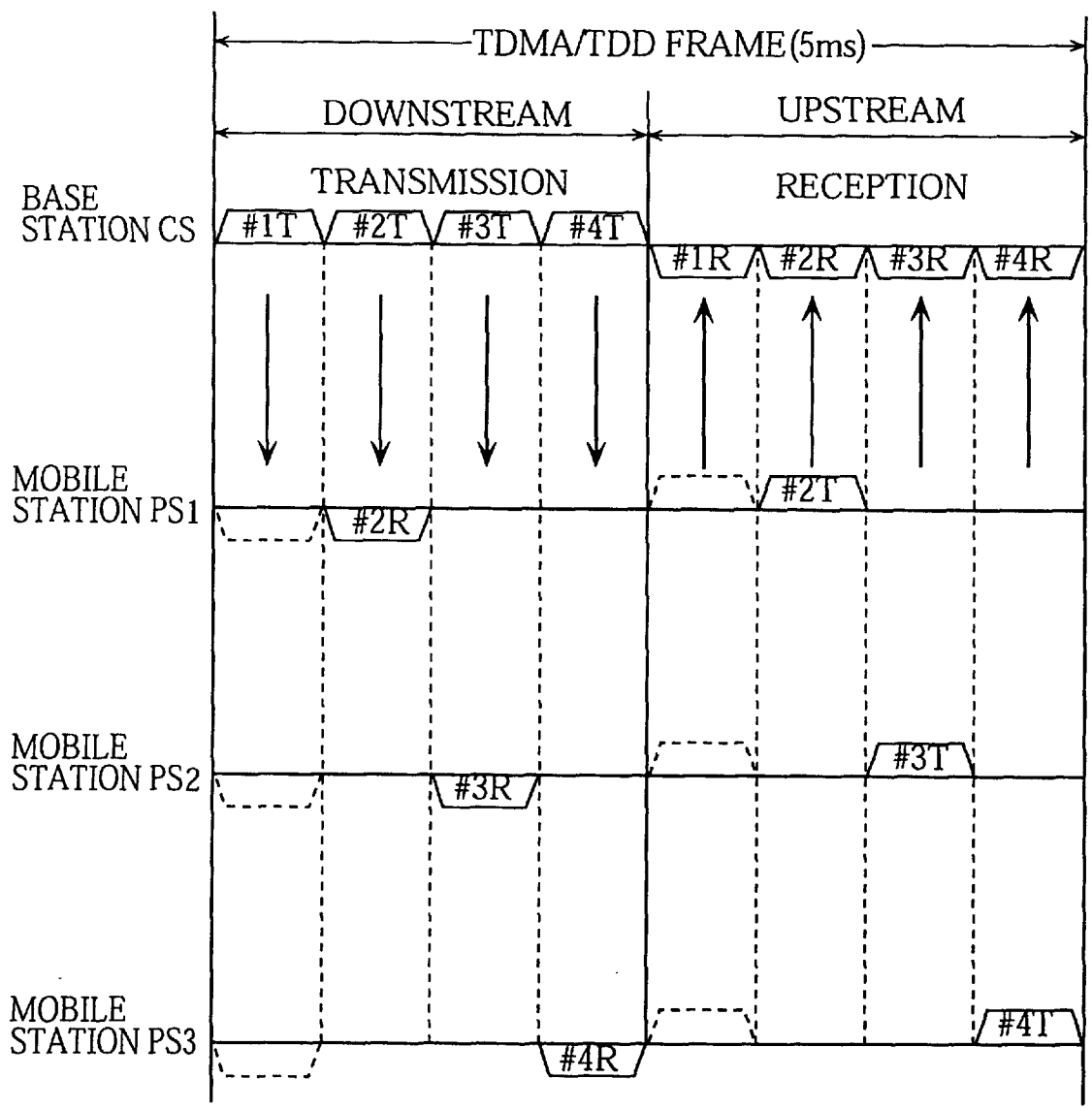
FIG. 1 shows an example TDMA/TDD frame for communication between a conventional PHS base station and mobile stations.

The base station 400 is made up of an antenna selecting switch unit, an RF (radio frequency) unit, an IF (intermediate frequency) unit, and a baseband unit. The base station 400 performs transmit-receive diversity using four antennas so as to radio-communicate with a plurality of mobile stations in the TDMA/TDD frames shown in FIG. 1.

The antenna selecting switch unit comprises four antennas 401 to 404 selectively used for transmit-receive diversity, band-pass filters 405 to 408 for allowing passage to signals in the communication band, antenna selecting switches 409 and 410 for connecting transmission signals of each system to antennas in the transmission time slots, transmit-receive selecting switches 411 to 414 for switching between transmission and reception, low noise amplifiers 415 to 418 for amplifying input signals inputted via the band-pass filters 405 to 408 in the reception time slots with less deterioration in C/N ratio (carrier to noise ratio: the ratio of input signal power to receiver noise temperature), isolators 419 and 420 for allowing passage to transmission signals in only one direction, dividers 421 to 424 for dividing input signals of each antenna after amplification into two systems, low-pass filters 425 and 426 for restraining high-frequency spurious that is an unwanted wave caused during operation along with a carrier wave necessary for communication, and power amplifiers (HPAs) 427 and 428 for amplifying signals up to transmission level.

In the antenna selecting switch unit, an antenna selecting switch 409 switches transmission signals of one system between only antennas 401 and 402. Another antenna selecting switch 410 switches transmission signals of the other system between only antennas 403 and 404. With this structure, it appears as if only two of the four antennas are used in each system, but, as described later, all the four antennas can be used by incorporating the switching of a cross switch 460. Here, it should be noted that one antenna cannot be used in two systems, and that the antennas 401 and 402 (or the antennas 403 and 404) cannot be used at the same time.

The RF unit processes each carrier wave for the two systems starting from the RF signal stage to the IF signal stage (or from the IF signal stage to the RF signals stage) using local frequency signals sent from PLL synthesizer units 435 and 436. One of the systems is structured around a receiving unit 431 and a transmitting unit 433, while the other is structured around a receiving unit 432 and a transmitting unit 434. The local frequencies of the PLL synthesizer units 435 and 436 are determined by PLL control units 437 and 438, and replaced at the same time as the cross connection of the cross switch 460 mentioned later.

In the RF unit, RF signals are inputted from all the four antennas into the receiving unit 431, and converted into IF signals, while the input signal level of each antenna is measured. The measured value of the input signal level is outputted to the judging unit 445 via an A/D converting unit 443, and used for antenna selection in transmit-receive diversity. The transmitting unit 433 converts IF signals sent from the IF unit into RF signals in transmission, and outputs them to the antenna selecting units via the HPA 427, the low-pass filter 425, and the isolator 419. The receiving unit 432 and the transmitting unit 434 operate in the same manner as described above.

The IF unit processes mainly modem units 451 and 452 starting from the IF signal stage to the baseband signal stage (or from the'baseband signal stage to the IF signal stage).

In the IF unit, a judging unit 445 and a control unit 446 perform selection control over the diversity antennas.

Figure 15:
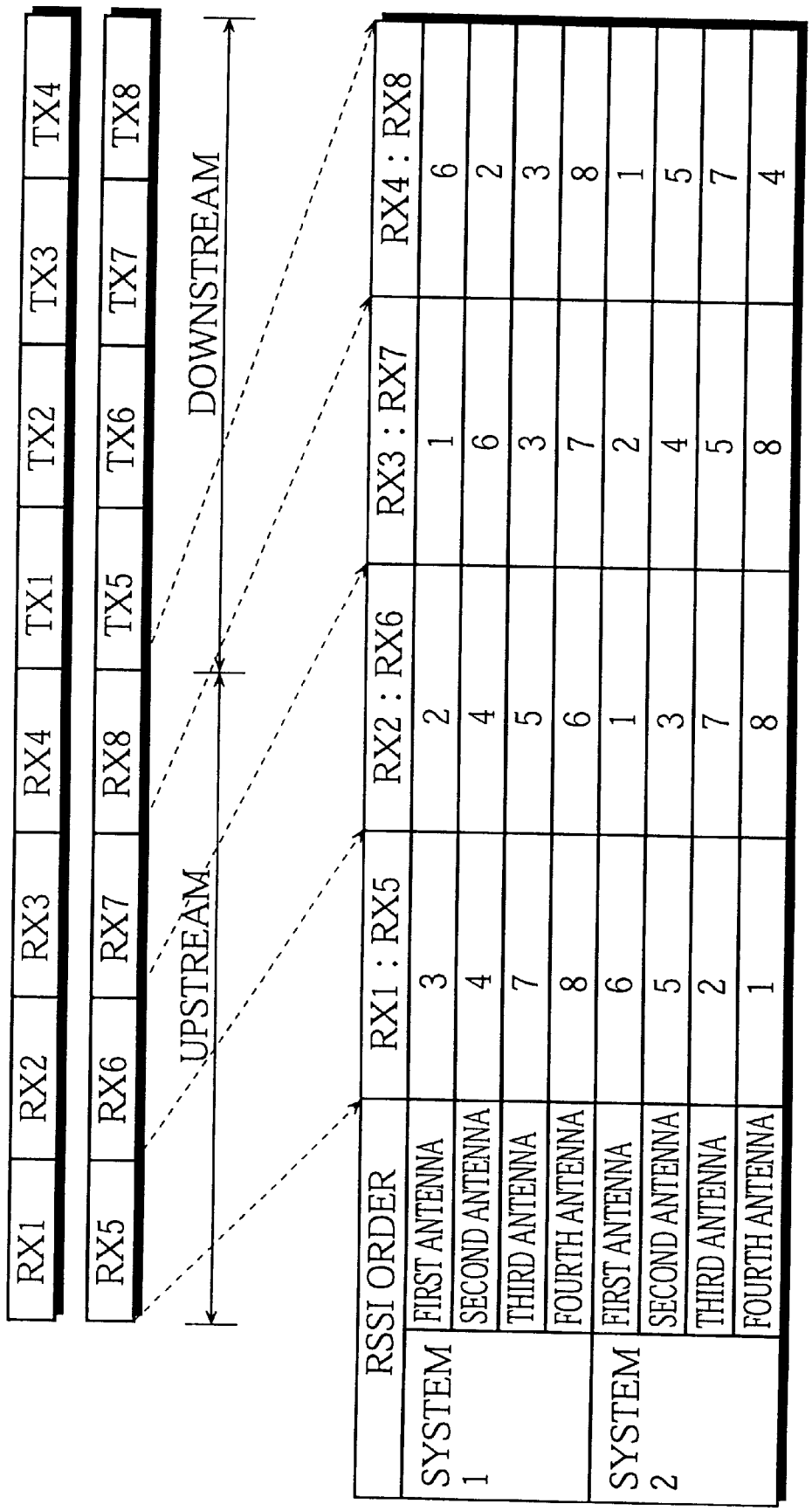
FIG. 15 shows example judgements of the judging unit.

In each upstream (reception) time slot, the judging unit 445 determines the highest, the second highest, and the third highest among the input signal levels inputted from the receiving unit 431 via the A/D converting unit 443. The judging unit 445 then determines the first antenna that has exhibited the highest input signal level, the second antenna that has exhibited the second highest input signal level, and the third antenna that has exhibited the third highest input signal level. The data of the highest input signal level and the first antenna, and the second antenna are then outputted as judgement results to the control unit 446. Likewise, the judging unit 445 determines the highest, the second highest, and the third highest among the measured input signal levels inputted from the receiving unit 432 via the A/D converting unit 444. The judging unit 445 then determines the first antenna that has exhibited the highest input signal level, the second antenna that has exhibited the second highest input signal level, and the third antenna that has exhibited the third highest input signal level. FIG. 15 shows an example judgement result of the judging unit 445. In this figure, the ranking of input signal levels in each reception time slot is shown with respect to the two carrier waves in synchronized TDMA/TDD frames. Although the ranking from the first to the eighth is shown in the figure, the judging unit 445 need to determine only the first and second in each system in the case where two systems exist. In the case of two systems, it is necessary to determine the second highest level, because if the first antennas of both systems have the same input signal level, one of the first antennas has to be changed to the second antenna.

In each reception time slot, the control unit 446 issues an instruction to convert the input signal corresponding to the first antenna determined in the receiving units 431 and 432 from RF into IF, in accordance with judgement of the judging unit 445.

The control unit 446 also controls switch setting of the cross switch 460, and the antenna selecting switches 409 and 410, in accordance with the judgement, so as to allocate each of the systems having different carrier waves (with the baseband signals of the TDMA processing units 471 and 472 being the standards) to the optimum one of the four antennas.

More specifically, in each downstream (transmission) time slot, the judging unit 445 checks whether the two first antennas determined in the previous upstream time slot corresponding to the present downstream time slot are identical or not.

If they are not identical, and they are a wrong pair (the pair of the antennas 401 and 402, or the antennas 403 and 404), the switch setting is controlled so that a different antenna for each system is used as the first antenna for transmission.

If the two first antennas are identical, or they are a right pair of antennas (not a wrong pair of antennas), the highest input signal level of the modulation signal in the system 1 is compared with the highest input signal level of the modulation signal in the system 2. The second or third antenna is selected for the modulation signal of the system with the higher input signal level, while the first antenna is selected for the modulation signal of the other system. The switch setting is controlled so that transmission is performed using the respective antennas.

The baseband unit comprises the TDMA processing units 471 and 472, and the cross switch 460. The TDMA processing units 471 and 472 inputs and outputs baseband signals to the IF unit in each time slot, so that communication data to and from the plurality of mobile stations will be in synchronization with the TDMA/TDD frames.

The cross switch 460 situated between the baseband unit and the IF unit switches between straight connection and cross connection under the control of the control unit 446. With the cross connection, two baseband signals from the TDMA processing units 471 and 472 are interchanged before the modem units 451 and 452. In the case of cross connection, as the carrier frequencies are also interchanged, the local oscillating frequencies are interchanged before the PLL control units 437 and 438 by the control unit 446. Thus, after the baseband signal transmission, the routes starting from the IF signal generation and ending in the RF signal generation can be interchanged.

FIG. 16 shows the selection control logic of the control unit 446 with respect to the switches 409 to 414, and the cross switch 460 in each transmission time slot.

In this figure, the column of "ANTENNA SELECTION" shows selection results of the control unit 446 with respect to the transmission antennas of the system 1 and system 2. Pairs of selected antennas exclude the combination of the same antennas, the combination of the antennas 401 and 402, and the combination of the antennas 403 and 404. The column of "SETTING OF ANTENNA SELECTING SWITCH" shows the control logic of the control unit 446 with respect to switches 409 to 416, and 460, that is, the selection command contents of the select signals outputted from the control unit 446 to those switches. Alphabetical characters "A" and "B" indicate the output terminals of the antenna selecting switches 409 and 410. Alphabetical characters "a" and "b" indicate the input terminals of the transmit-receive selecting switches 411 to 414 shown in FIG. 14. The chart in FIG. 16 shows only "a" in the columns of the switches 411 to 414, because only transmission is performed. Alphabetical characters "S" and "C" indicate straight connection and cross connection, respectively.

Figure 17:
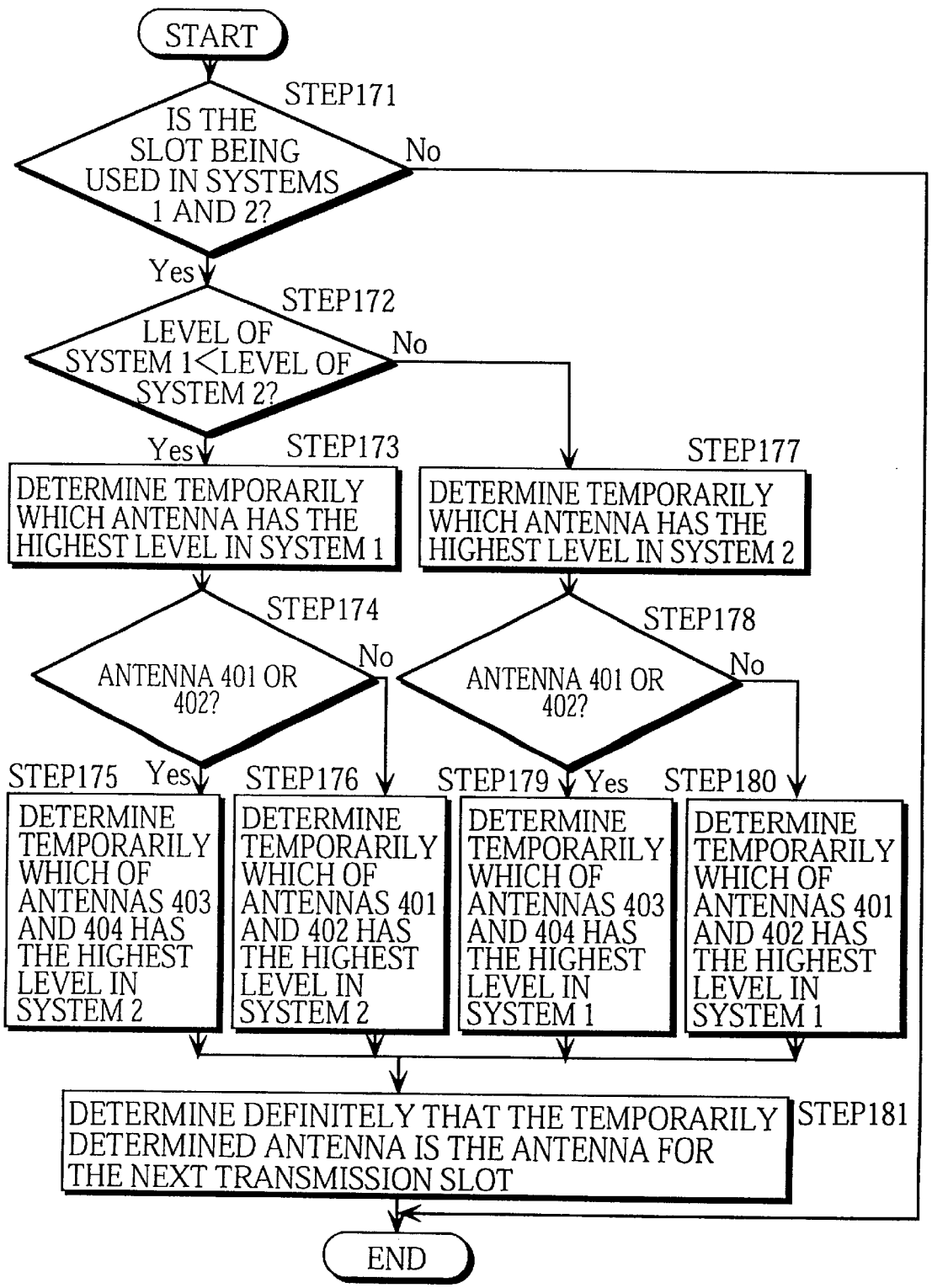
FIG. 17 is a flowchart showing the transmission antenna selecting process for the system 1 and system 2 performed by the control unit.

FIG. 17 is a flowchart showing the antenna selecting process performed by the control unit 446 with respect to the system 1 and system 2 in the downstream time slots, i.e., the "ANTENNA SELECTION" process shown in FIG. 16.

Upon receipt of the judgement of the judging unit 445 in a reception time slot, the control unit 446 determines the transmission antenna for each system in the transmission time slot corresponding to the reception time slot, and selects the determined transmission antenna for each system in the transmission time slot.

If the system 1 and system 2 are both occupied in the present time slot (step 171), the control unit 446 compares the highest input signal level in the system 1 with the highest input signal level in the system 2 (step 172).

If the highest input signal level in the system 1 is smaller, the judging unit 131 allocates the antenna that shows the highest input signal level in the system 1 as the next transmission antenna for the system 1 (step 173). If the transmission antenna determined temporarily in the system 1 is the antenna 401 or 402 (step 172: Yes), the antenna that has the higher input signal level of the antennas 403 and 404 in the system is allocated as the transmission antenna (step 175). If the transmission antenna determined temporarily in the system 1 is neither the antenna 401 or 402 (step 174: No), the antenna that has the higher input signal level of the antennas 401 and 402 is allocated as the transmission antenna (step 176).

If the highest input signal level in the system 1 is not smaller, the antenna allocation is performed in the same manner, except that the processing order for the system 1 and system 2 is reversed (steps 177 to 180).

The control unit 446 then selects the allocated antennas for the system 1 and system 2, respectively, as the transmission antennas in the next transmission time slot (step 811).

The following is an explanation of the operation of the base station 400 of the fourth embodiment having the structure as described above, with reference to the example ranking of the input signal levels shown in FIG. 15.

In the first example operation, the first slot of the system 1 and the first slot of the system 2 are used at the same time. In the upstream slots, the receiving units 431 and 432 receive signals, measure the input level of each signal, and output RSSI signals.

The judging unit 445 judges from the RSSI signals outputted from the receiving units 431 and 432 which antenna has the highest input signal level. The judging unit 445 determines that the antenna 401 has the highest input signal level in the system 1 and the antenna 404 has the highest input signal level in the system 2 as shown in FIG. 15. The judging unit 445 then outputs a judgement signal to the control unit 446.

Upon receipt of the judgement signal, the control unit 446 controls the cross switch 460 so that the antenna 104 and 402 will be allocated to the system 1 and the antenna 403 and 404 will be allocated to the system 2, and that the antenna selecting switch 409 will select the antenna 401 and the antenna selecting switch 410 will select the antenna 404.

Accordingly, transmission signals of the system 1 pass through the cross switch 460 without interchange, and are then transmitted from the antenna 401 selected by the antenna selecting switch 409.

Transmission signals of the system 2 also pass through the cross switch 460 without interchange, and are then transmitted from the antenna 404 selected by the antenna selecting switch 410.

In the second example operation, the second slot of the system 1 and the second slot of the system 2 are used at the same time. The second slots are denoted by RX2 and RX6 in FIG. 15. As described above, the receiving units 431 and 432 receive signals, measures the input level, and outputs RSSI signals in the upstream slots.

Firstly, the judging unit 445 judges which antenna has the highest input signal level from the RSSI signals from the receiving units 431 and 432. The judging unit 445 determines that the antenna 401 has the highest input signal level in the system 1, and the antenna 401 also has the highest input signal level in the system 2. The judging unit 445 then outputs a judgement signal to the control unit 446.

In this embodiment, however, transmission signals cannot be outputted from the same antenna.

To select different antennas, the following procedure is performed. Firstly, the highest input signal levels of the input signal levels received in the system 1 and system 2 are compared, and which system has the lower input signal level is determined.

In FIG. 15, as the antenna 401 having the highest input signal level shows a lower input signal level in the system 1 than in the system 2, priority is given to the system 1 having the lower input signal level with respect to the antenna 401. Thus, the antenna 401 is allocated to the system 1. However, a transmission antenna to be selected for the system 2 is yet to be determined, and the antenna selection for the system 2 is conducted as follows.

The judging unit 445 determines which antenna should be used for transmission of the system 2. Here, the input signal levels shown in FIG. 15 are used as a basis. In the system 2, the input signal level of the antenna 402 is the highest next to the antenna 401 (that is, the antenna 402 has the third highest level overall), and therefore, the antenna 402 is to be selected.

However, the antenna 402 cannot be used here, because it is allocated to the system 1 comprising the HPA 427, the low-pass filter 425, the isolator 419, and the antenna selecting switch 490.

Accordingly, it is necessary to use the antennas allocated to the other system comprising the HPA 428, the low-pass filter 426, the isolator 420, and the antenna selecting switch 410.

The judging unit 445 determines that the antenna 403 (the seventh of all) has the highest input signal level next to the antenna 402 in the system 2. The judging unit 445 then outputs a judgement signal. Upon receipt of the judging signal, the control unit 446 controls the cross switch 460 so as to select the antenna 401 for the system 1 and the antenna 403 for the system 2 in the downstream slots.

As a result, the antenna selecting switch 409 selects the antenna 401, and the antenna selecting switch 410 selects the antenna 403.

In the third example operation, the third slot of the system 1 and the third slot of the system 2 are used simultaneously.

In the upstream slots, the receiving units 431 and 432 receive signals transmitted, measure the input signal levels, and output RSSI signals. The judging unit 445 judges from the RSSI signal outputted from the receiving units 431 and 432 which antenna has the highest input signal level.

In the fourth example operation, the third slot of the system 1 and the third slot of the system 2 are simultaneously used for communication. These third slots are indicated by "RX3" and "RX7" in FIG. 15. As described above, the receiving units 431 and 432 receive signals, measure the input signal levels, and output RSSI signals in the upstream slots.

Firstly, the judging unit 445 judges from the RSSI signal outputted from the receiving units 431 and 432 which antenna has the highest input signal level. As shown in FIG. 15, the judging unit 445 determines that the antenna 401 has the highest input signal level both in the system 1 and system 2. The judging unit 445 then outputs a judgement signal to the control unit 446.

In this embodiment, however, the same antenna cannot be used for both systems to output transmission signals.

As in the second example, the procedure described below is performed successively. Firstly, the highest input signal levels of both systems are compared, and which system has the lower input signal level is judged.

In the case of "RX3:RX7" in FIG. 15, as the highest input signal level of the system 2 is lower than the system 1, priority is given to the system 2 having the lower input signal level with respect to the antenna 401. Thus, the antenna 401 is selected for the system 2. However, a transmission antenna to be selected for the system 1 is yet to be determined, and the antenna selection for the system 1 is conducted as follows.

The judging unit 445 determines which antenna should be used for transmission in the system 1. Here, the input signal levels shown in FIG. 15 are used as a basis. In the system 1, the input signal level of the antenna 403 is the highest next to the antenna 401 (that is, the antenna 403 has the third highest level overall), and therefore, the antenna 403 is to be selected.

Unlike in the second example, the antenna 403 is not allocated to the same system as the antenna 401. Thus, transmission is conducted through the antenna 403 in the system 1, and through the antenna 401 in the system 2.

Here, the control unit 446 controls the cross switch 460 so as to transmit signals through the antenna 403 in the system 1, and through the antenna 401 in the system 2.

In the case where the systems are interchanged (that is, the antenna 403 and 404 are used for transmission in the system 1, while the antennas 401 and 402 are used for transmission in the system 2), the control unit 446 controls the PLL control units 437 and 438 so that the transmission frequencies of the transmitting units 433 and 434 will comply with the interchange. By doing so, frequencies corresponding to the respective channels can be transmitted.

When transmission signals from the system 1 are transmitted through the antennas 401 and 402, the PLL synthesizer unit 435 outputs a local frequency so that the frequencies of the transmission signals will correspond to the slots of the system 1. When transmission signals from the system 2 are transmitted through the antennas 401 and 402, the PLL synthesizer unit 435 outputs a local frequency so that the frequencies of the transmission signals will correspond to the slots of the system 2.

In the fifth example operation, the fourth slot of the system 1 and the fourth slot of the system 2 are simultaneously used for communication. These fourth slots are indicated by "RX4" and "RX8" in FIG. 15. As described above, the receiving units 431 and 432 receive signals, measure the input signal levels, and output RSSI signals in the upstream slots.

The judging unit 445 judges from the RSSI signals from the receiving units 431 and 432 which antenna has the highest input signal level. As shown in FIG. 15, the judging unit 445 judges that the antenna 402 has the highest input signal level in the system 1, and that the antenna 401 has the highest input signal level in the system 2. The judging unit 445 then outputs judgement signals to the control unit 446.

However, because of the structural characteristics of this embodiment described above, two transmission signals cannot be simultaneously outputted from the same antenna.

To select different paths for the transmission signals, the following process is performed. The highest input signal level in the system 1 is compared with the highest input signal level in the system 2, and the system has the lower input level is selected.

As the highest input signal level of the system 1 is lower than the system 2 as shown in FIG. 15, priority is given to the system 1 having the lower input signal level with respect to the antenna 402. Thus, the antenna 402 is selected for the system 1. However, a transmission antenna to be selected for the system 2 is yet to be determined, and the antenna selection for the system 1 is conducted as follows.

The judging unit 445 determines which antenna should be used for transmission in the system 2. Here, the input signal levels shown in FIG. 15 are used as a basis. In the system 2, the input signal level of the antenna 404 is the highest next to the antenna 401 (that is, the antenna 404 has the fourth highest level overall), and therefore, the antenna 404 is to be selected.

Accordingly, the judging unit 445 judges that transmission should be performed through the highest level antenna 404 (the fourth highest overall), and outputs a judgement signal. Here, the control unit 446 controls the cross switch 460 so as to transmit signals through the antenna 401 in the system 1, and through the antenna 403 in the system 2.

Consequently, the antenna selecting switch 409 selects the antenna 402, while the antenna selecting switch 410 selects the antenna 404.

[Fifth Embodiment]

Figure 18:
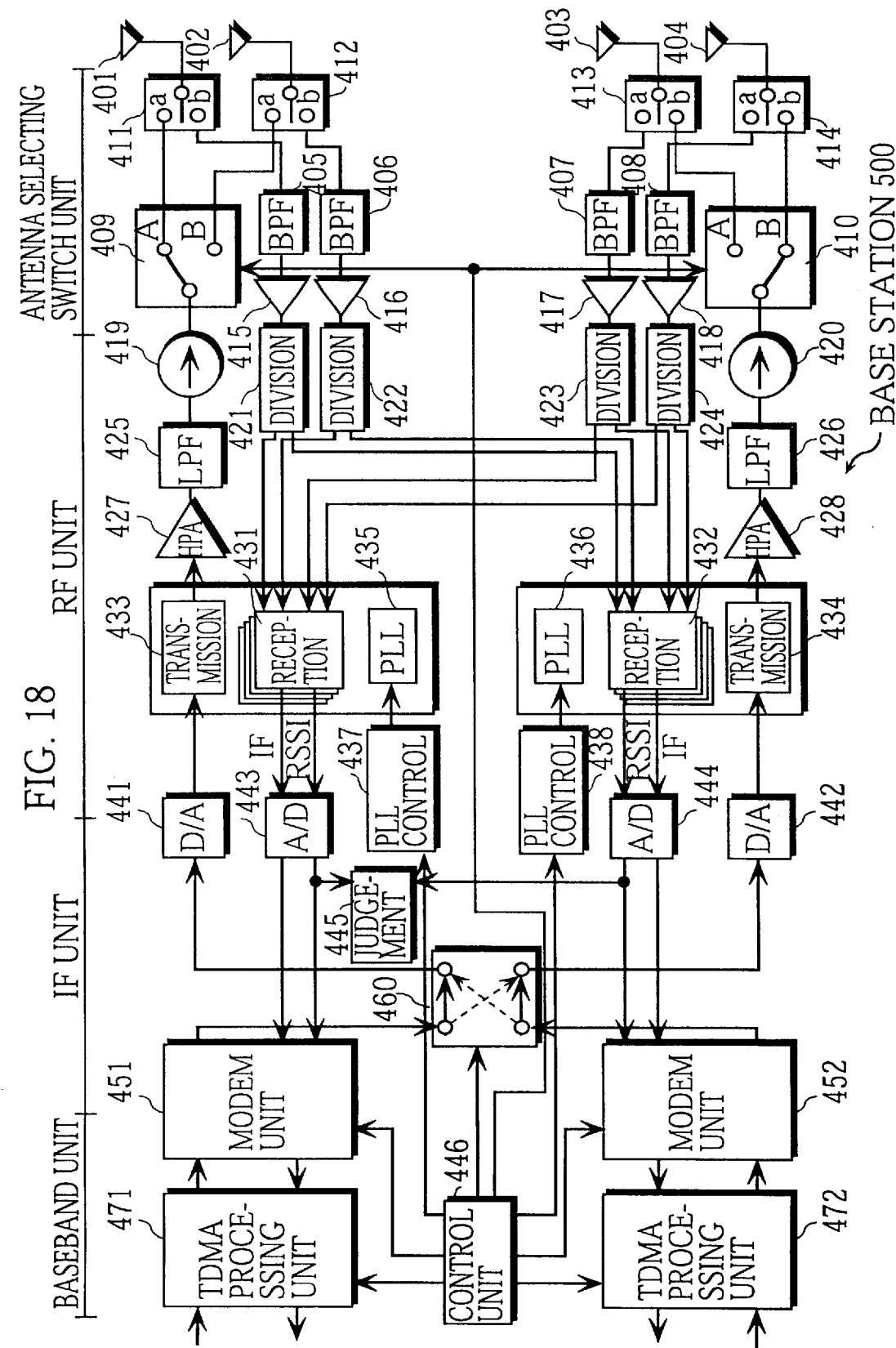
FIG. 18 is a circuit block diagram showing the main part of the base station of the fifth embodiment.

FIG. 18 is a block diagram showing the main parts of the structure of a base station 500 of the fifth embodiment of the present invention. The structure of this embodiment shown in FIG. 18 is the same as the base station of the fourth embodiment shown in FIG. 14, except that the positions of the modem units 451 and 452, and the cross switch 460 are interchanged. The base station 500 operates in the same manner as in the fourth embodiment.

Since the cross switch 460 is used for switching the signal paths, it can be arranged either as in FIG. 14, or as in FIG. 18.

The disposition of the cross switch 460 is not limited to the block diagrams of FIGS. 14 and 18. It can be placed anywhere as long as it is used for switching the signal paths, and the same effect can be obtained by controlling it in a suitable manner.

[Sixth Embodiment]

Figure 19:
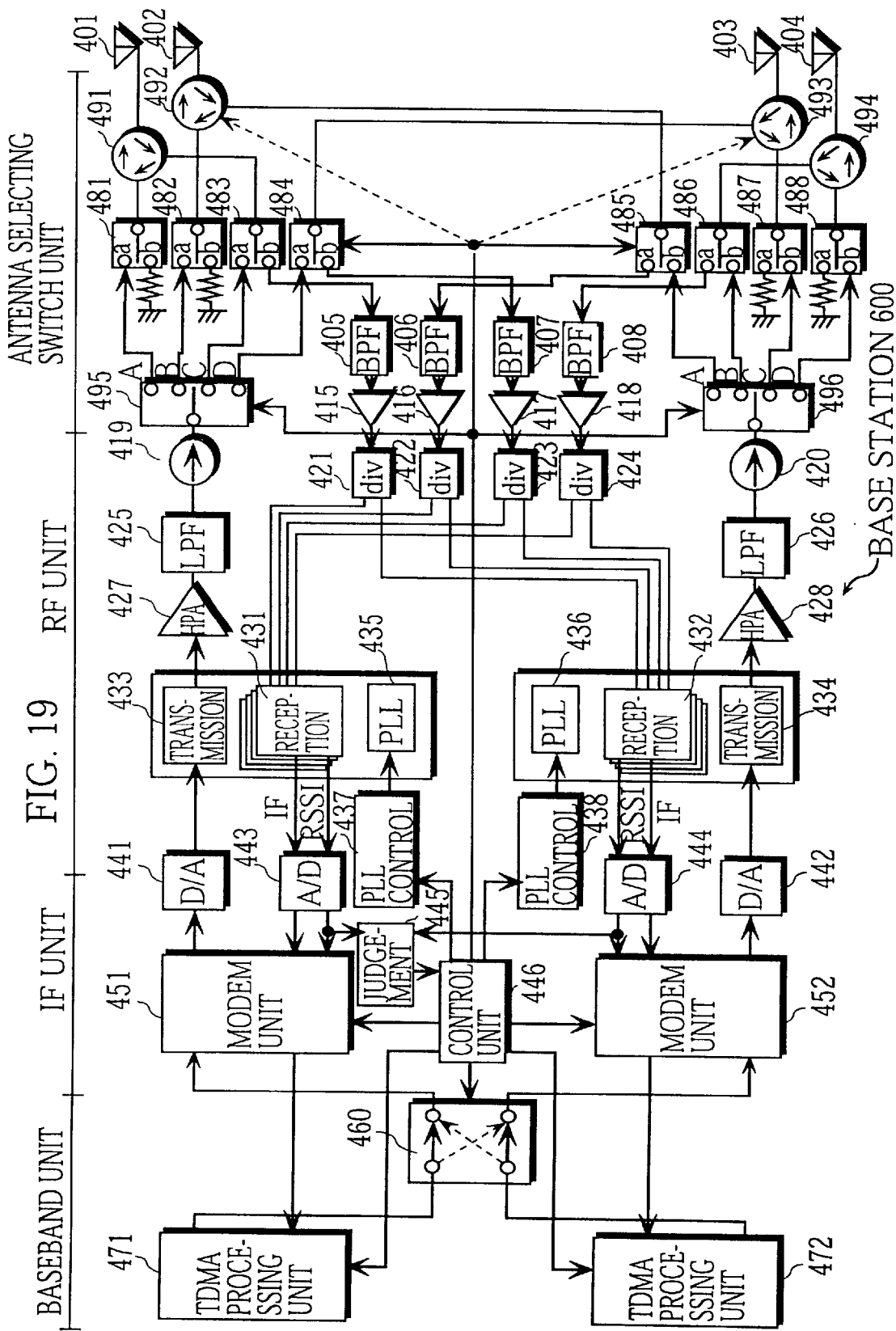
FIG. 19 is a circuit block diagram showing the main part of the base station of the sixth embodiment.

FIG. 19 is a block diagram showing the main parts of the structure of a base station 600 of the sixth embodiment of the present invention.

The base station 600 comprises an antenna selecting unit, an RF (radio frequency) unit, an IF (intermediate frequency) unit, and a baseband unit. The base station 600 performs transmit-receive diversity using four antennas so as to radio-communicate with a plurality of mobile stations in the TDMA/TDD frames shown in FIG. 2. The RF unit, the IF unit, and the baseband unit of the base station 600 are substantially the same as those of the base station 400 shown in FIG. 14. The following description mainly concerns the different aspects of the two embodiments.

The different aspects include the control operations by the antenna selecting unit, the judging unit 445, and the control unit 446.

The antenna selecting switch unit comprises four antennas 401 to 404 selectively used for transmit-receive diversity, band-pass filters 405 to 408 for allowing only the signals in the communication band to pass through, transmission-terminal resistance selecting switches 481, 482, 487, and 488, multi-port non-reciprocal circulators 491 to 494 for outputting port input to the adjacent port, antenna selecting switches 495 and 496 for connecting transmission signal of each system to a desired antenna in the transmission time slots, low noise amplifiers 415 to 418 for amplifying input signals inputted via the band-pass filters 405 to 408 in the reception time slots with less deterioration in C/N ratio (carrier to noise ratio: the ratio of input signal power to receiver noise temperature) isolators 419 and 420 for allowing a passage to transmission signals in only one direction, dividers 421 to 424 for dividing input signals of each antenna after amplification into two systems, low-pass filters 425 and 426 for restraining high-frequency spurious that is an unwanted wave caused during operation along with a carrier wave necessary for communication, and power amplifiers (HPAs) 427 and 428 for amplifying signals up to transmission level.

Figure 20:
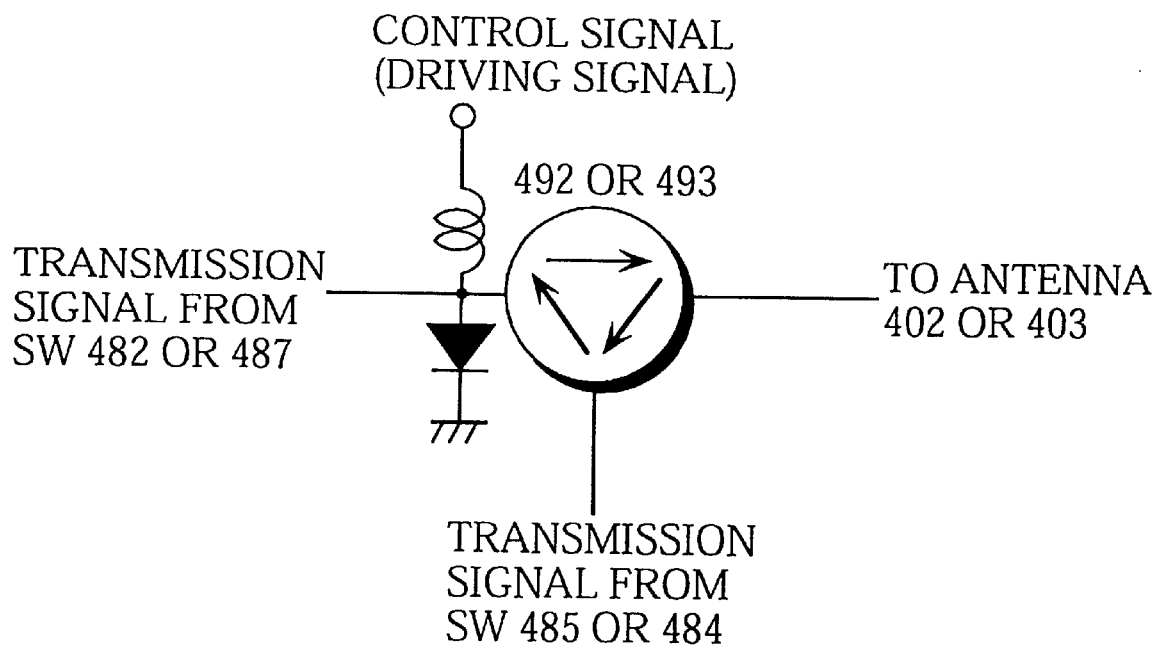
FIG. 20 shows the circuit structure in the vicinity of circulators.

In the antenna selecting switch unit, the circulators 491 to 494 function as transmit-receive selecting switches. The circulators 492 and 493 selects transmission signals of the two systems, and both are provided with a diode shown in FIG. 20. The port on the transmission-terminal selecting switch 482 (or 487) of the circulator 492 (or 493) is connected to the diode which switches on and off in response to control signals from the control unit 446. When the diode is on, the diode-connected port inwardly total-reflects the signals which are supposed to be outputted to the outside. The total-reflected signals are then outputted from the adjacent port. By doing so, the transmission signals from the transmit-receive selecting switch 485 can be total-reflected inside the diode-connected port, and then outputted to the port to which the antenna 402 is connected.

The antenna selecting switch 495 can switch the transmission signals of one system between the antennas 401 and 402, and the antenna 403 via the circulator 493. The antenna selecting switch 496 can switch the transmission signals of the other system between the antennas 403 and 404, and the antenna 402 via the circulator 492. With this structure, only three of the four antennas are used in each system, but all the four antennas can be used by combining the use of the cross switch 460. It should be noted, however, that the same antenna cannot be used simultaneously in both systems.

Figure 21:
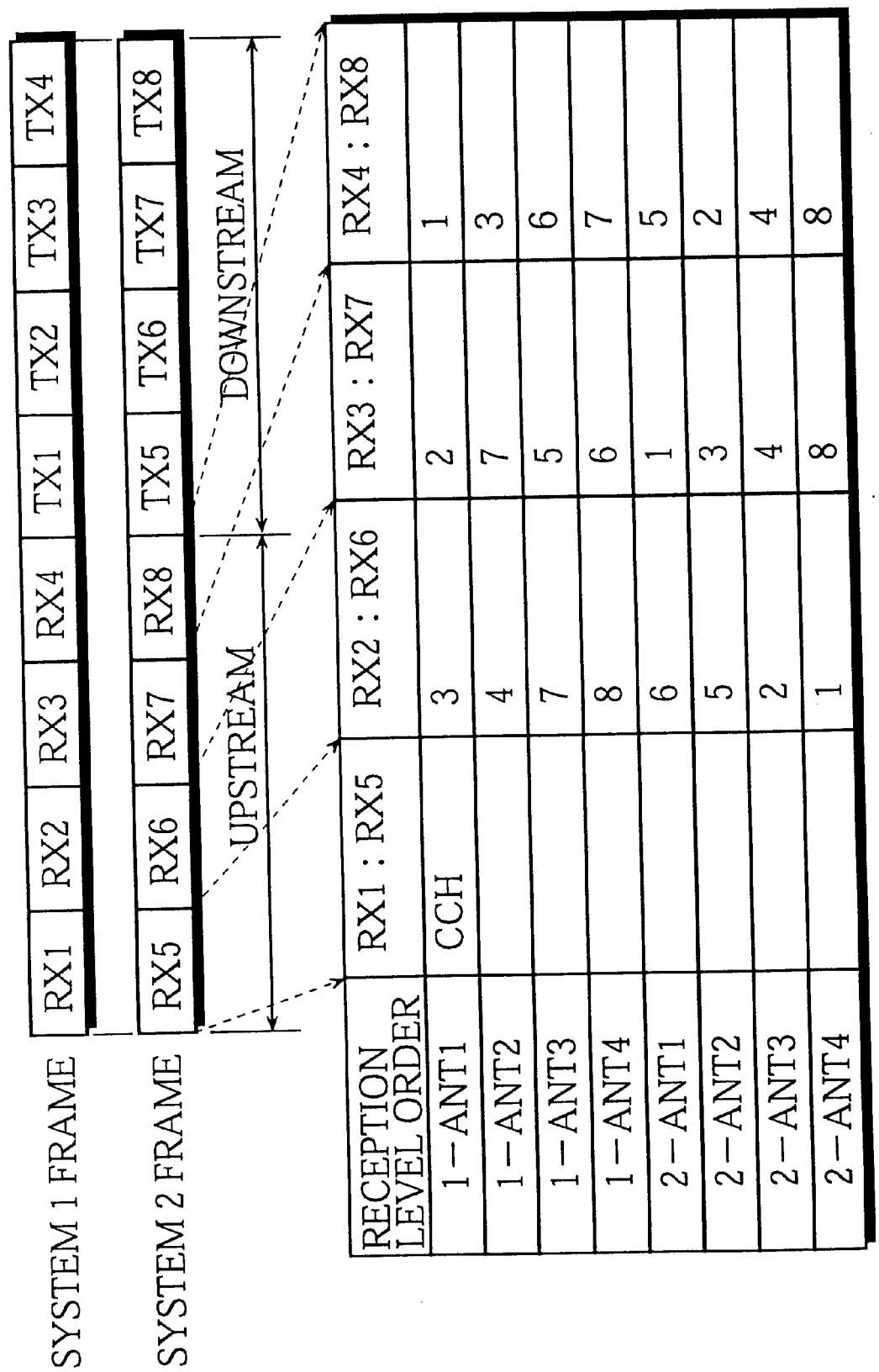
FIG. 21 shows example judgements of the judging unit.

FIG. 21 shows an example judgement result of the judging unit 445. This figure shows the ranking of input signal level of the two carrier waves in synchronized TDMA/TDD frames shown in FIG. 1 in each reception time slot.

FIG. 22 shows the selection control logic of the control unit 446 with respect to the switches 409 to 414, and the cross switch 460 in each transmission/reception time slot.

Figure 24B:
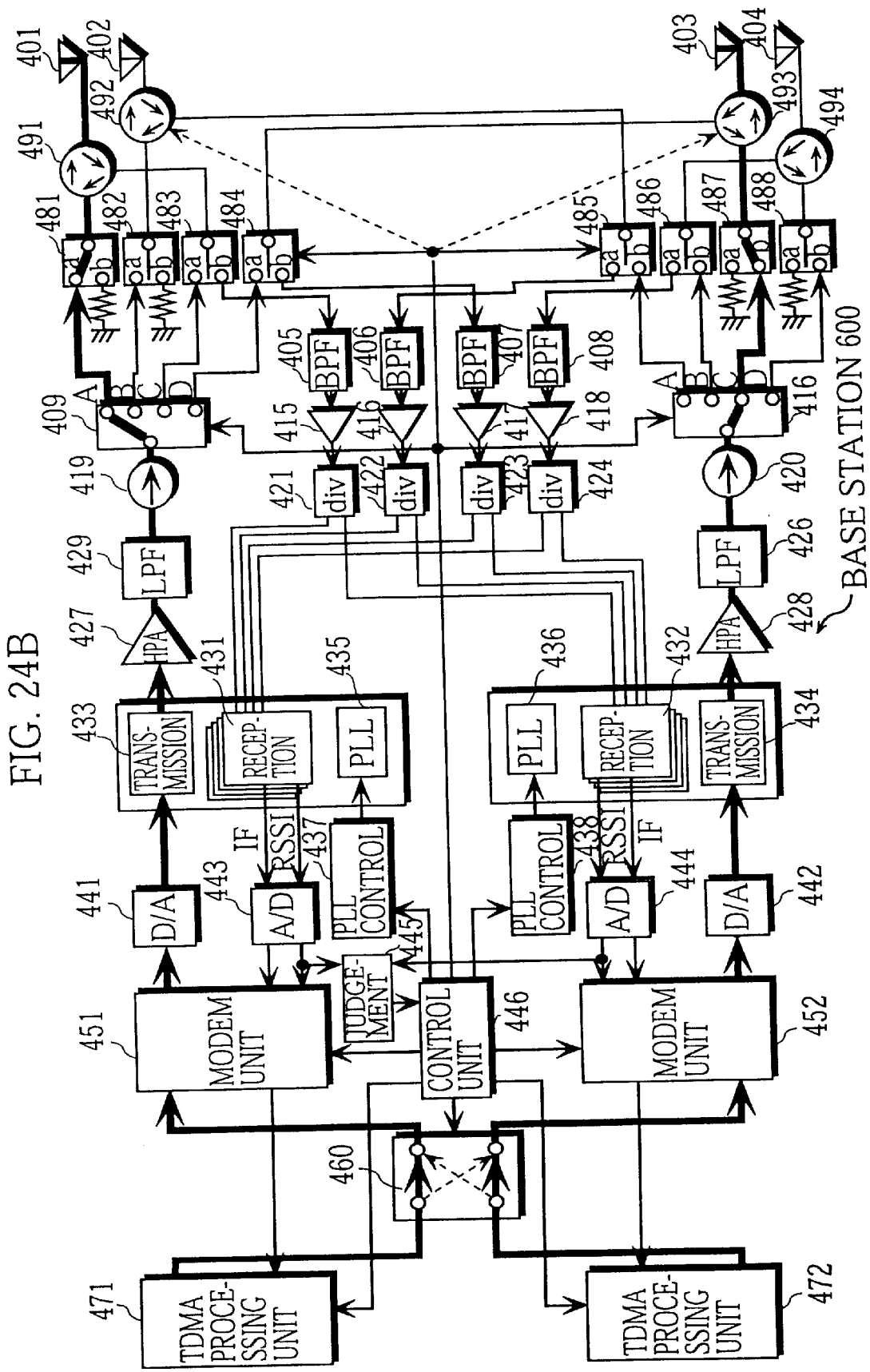
Figure 24C:
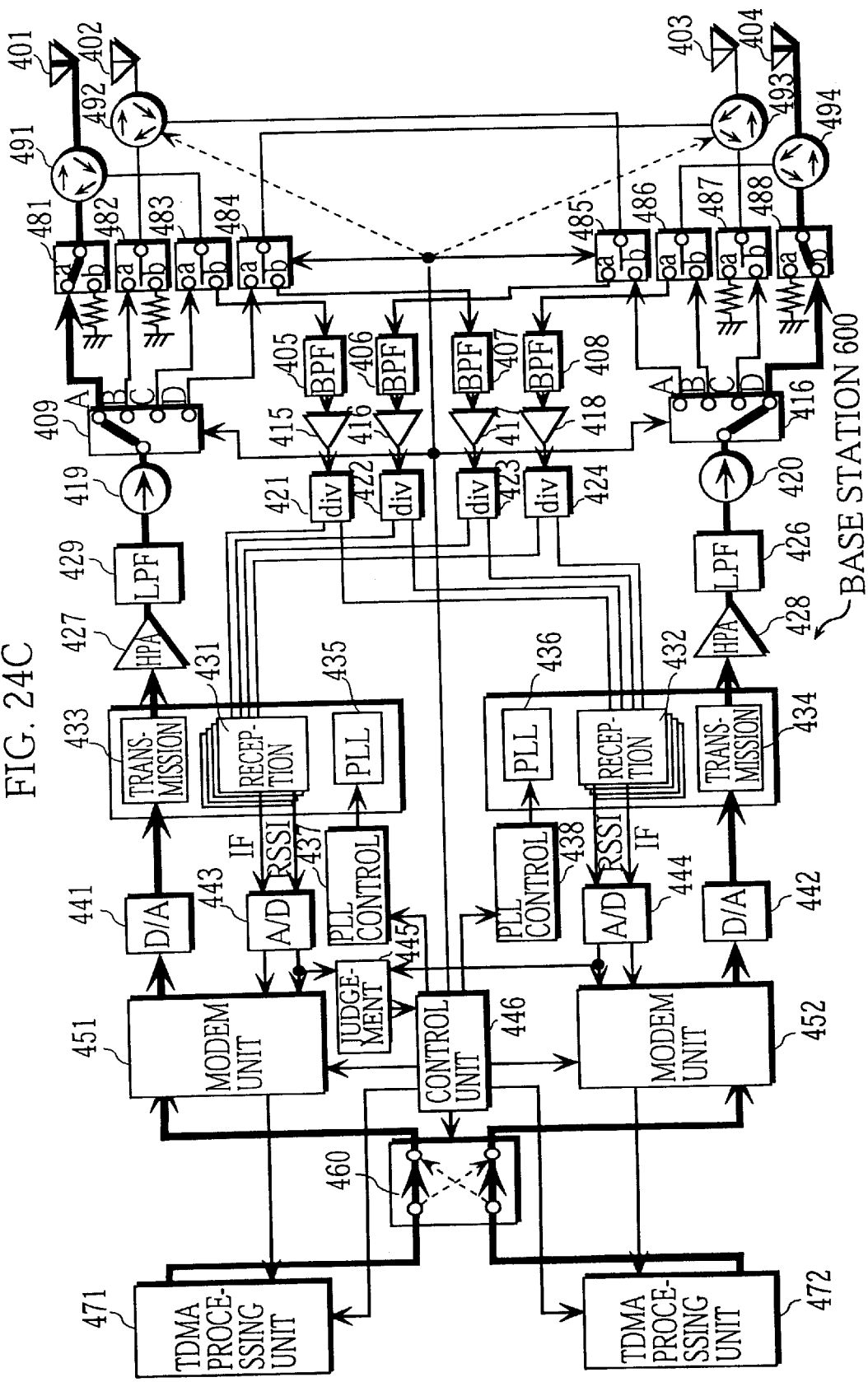
Figure 24E:
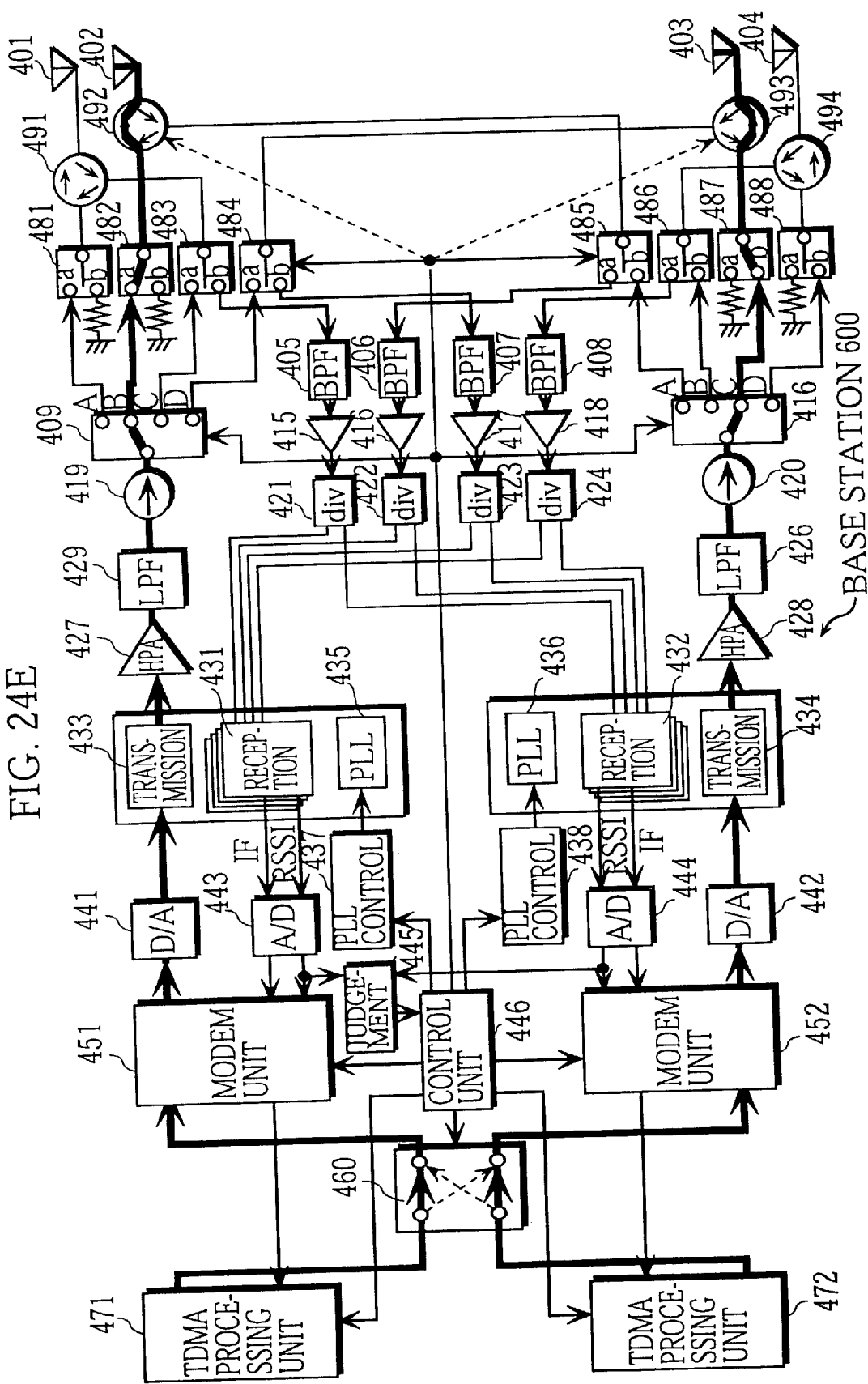
Figure 24F:
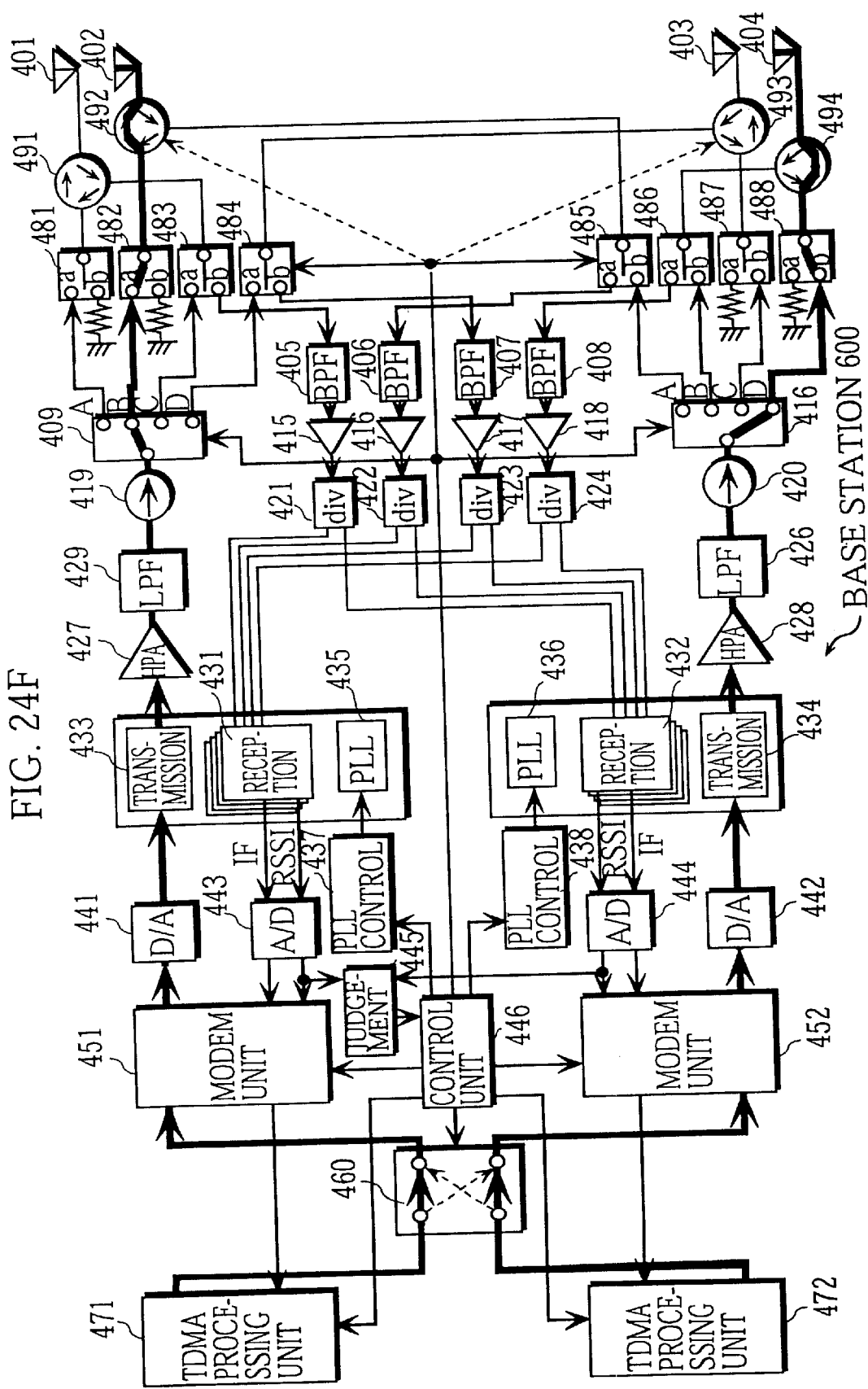
Figure 24G:
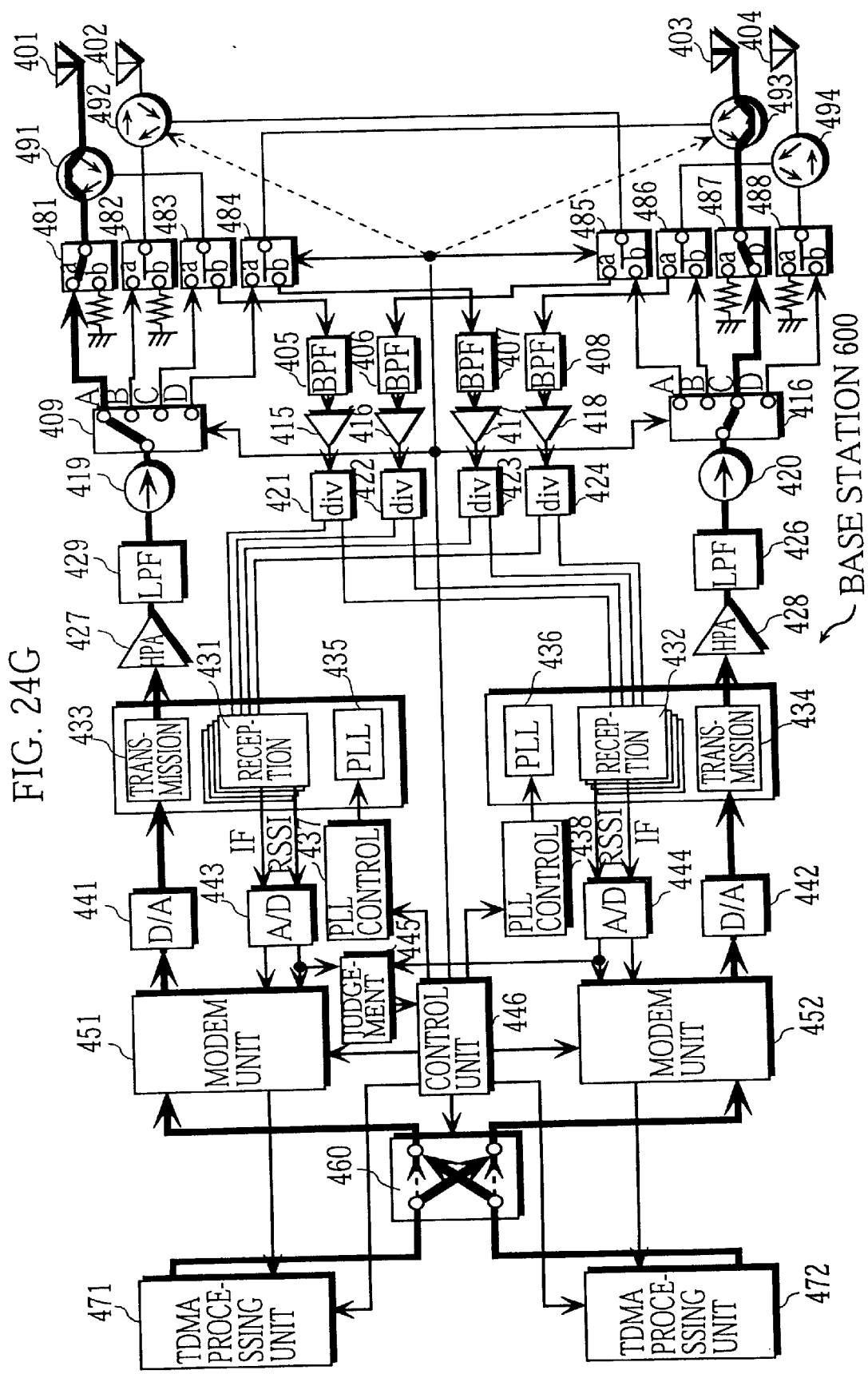
Figure 24H:
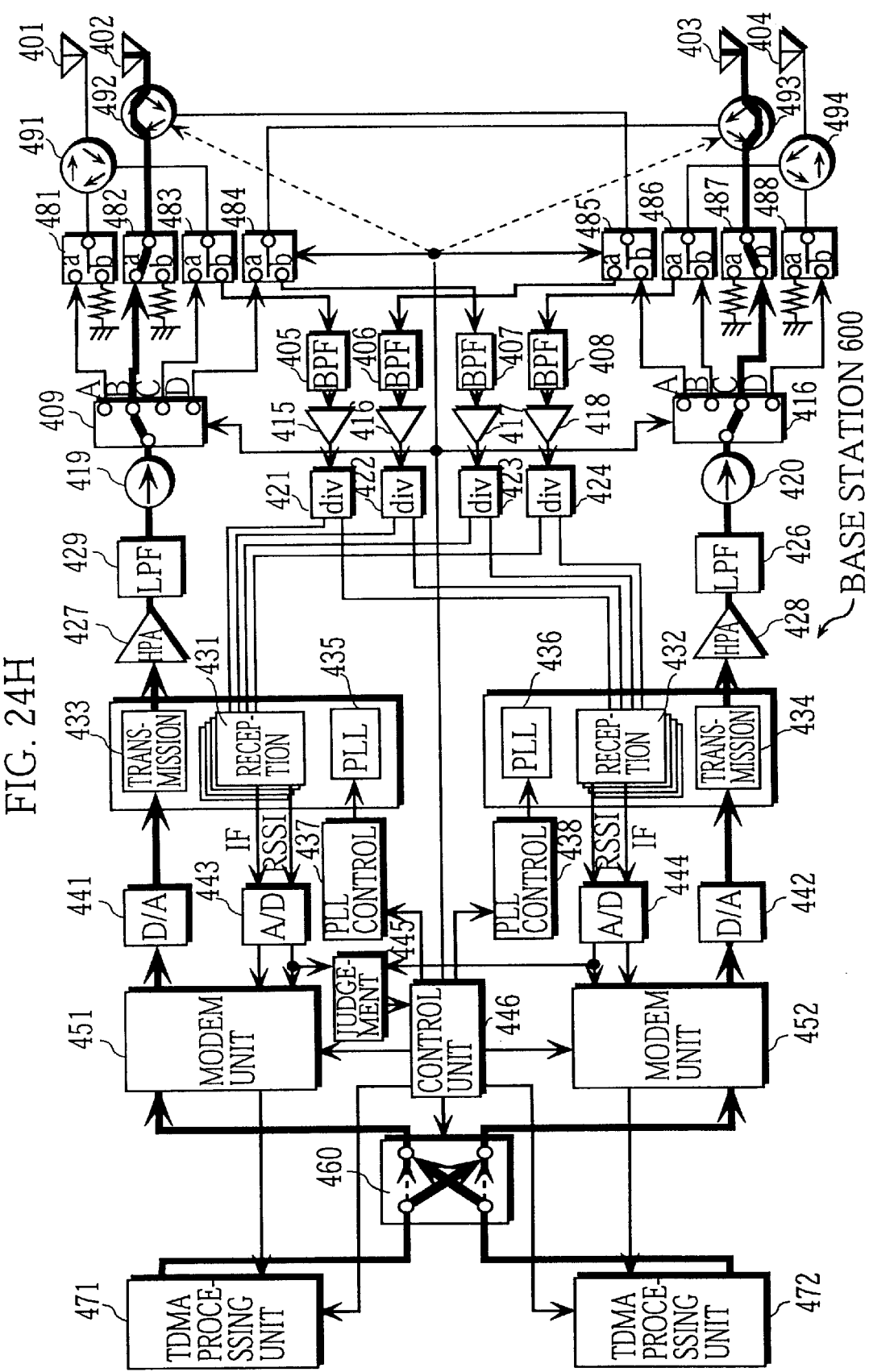
Figure 24I:
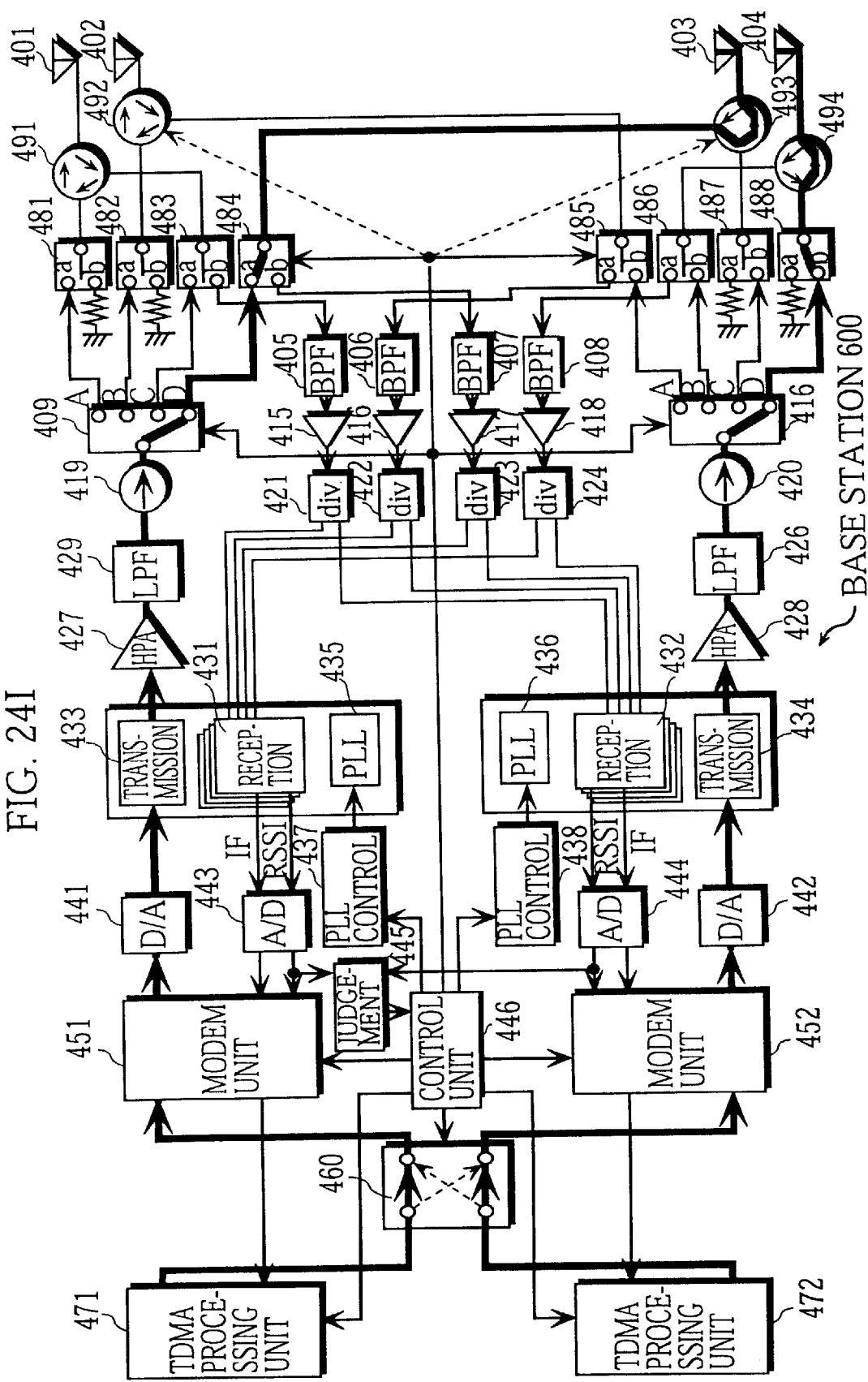
Figure 24J:
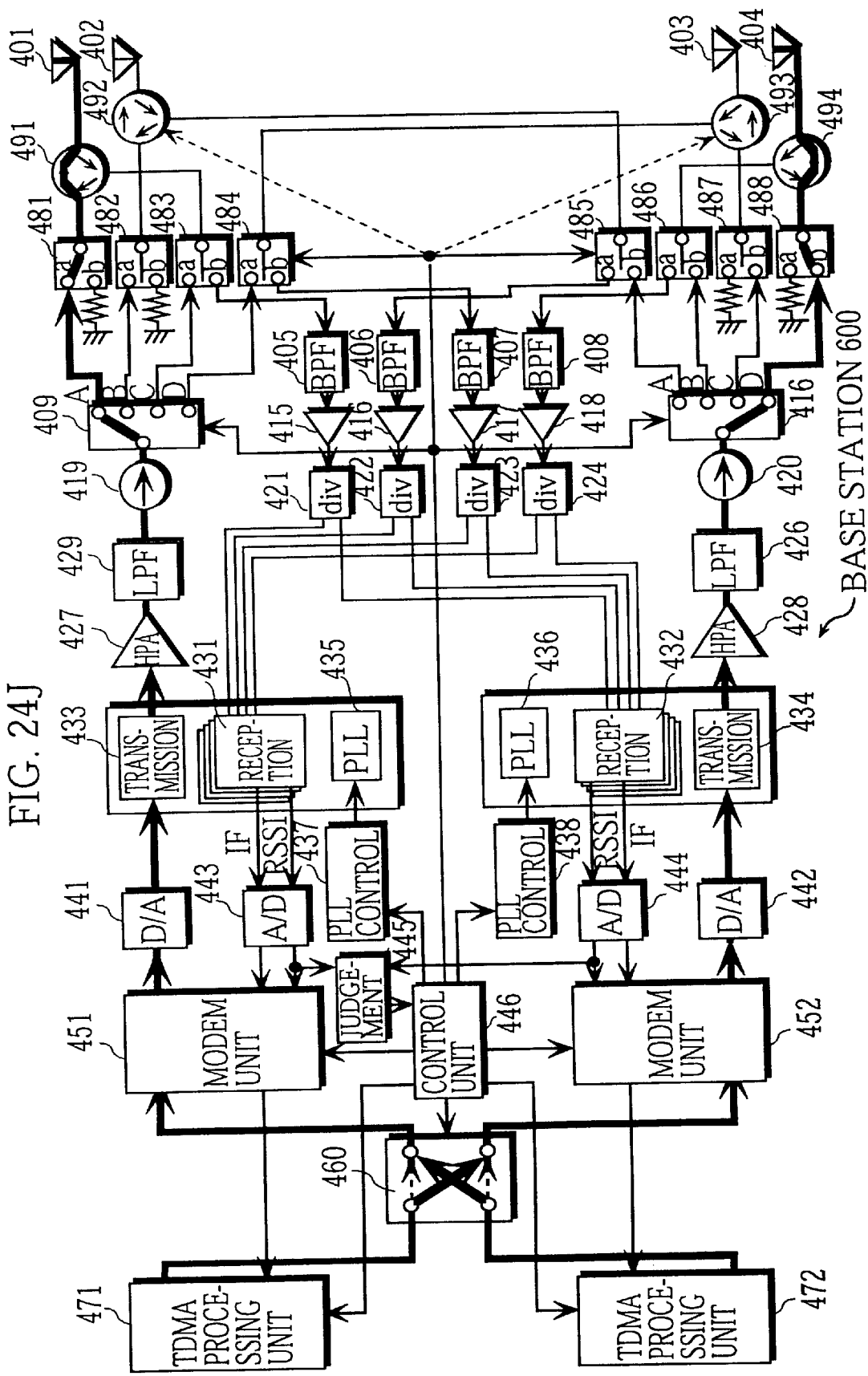
Figure 24K:
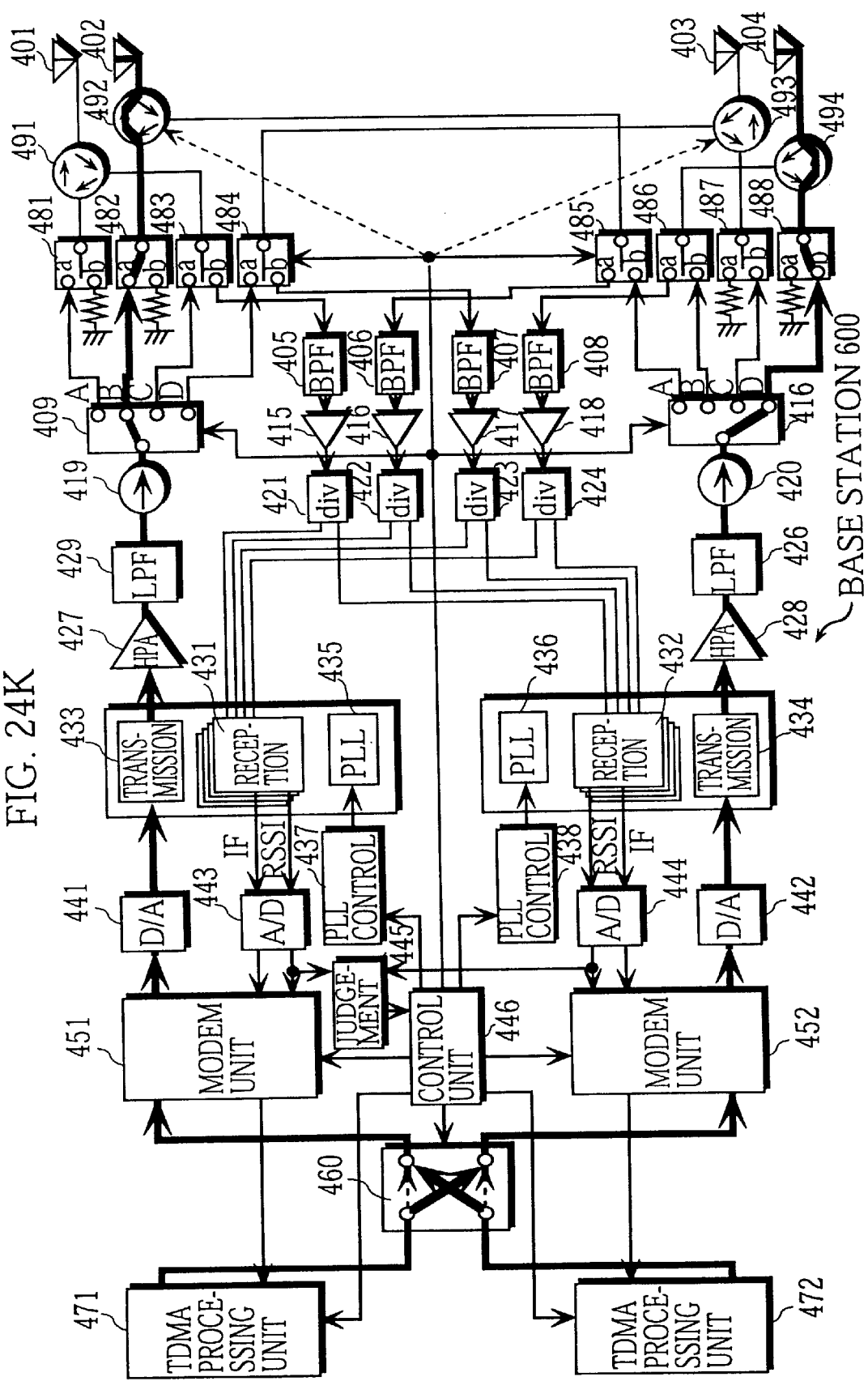
Figure 24L:
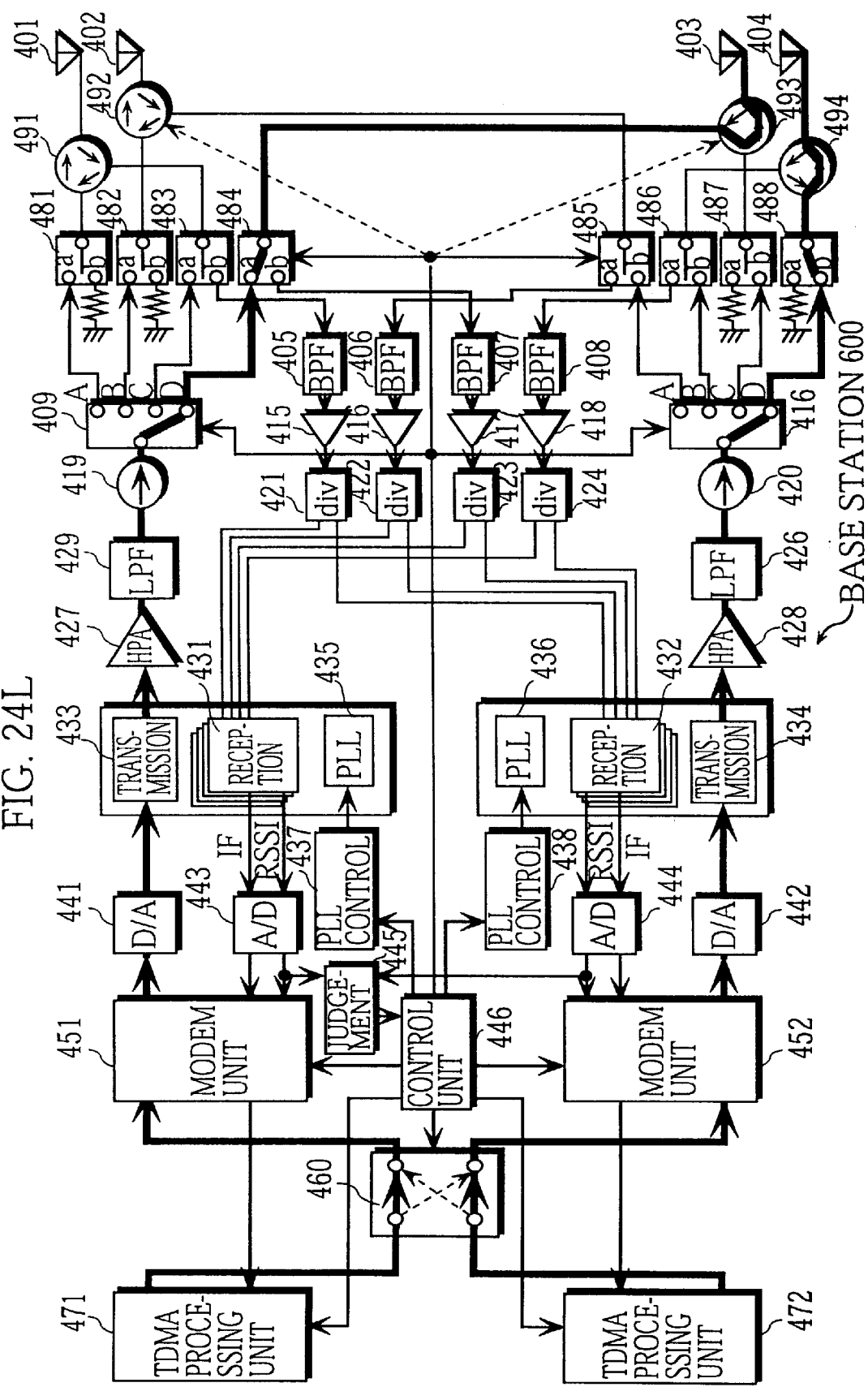
Figure 24M:
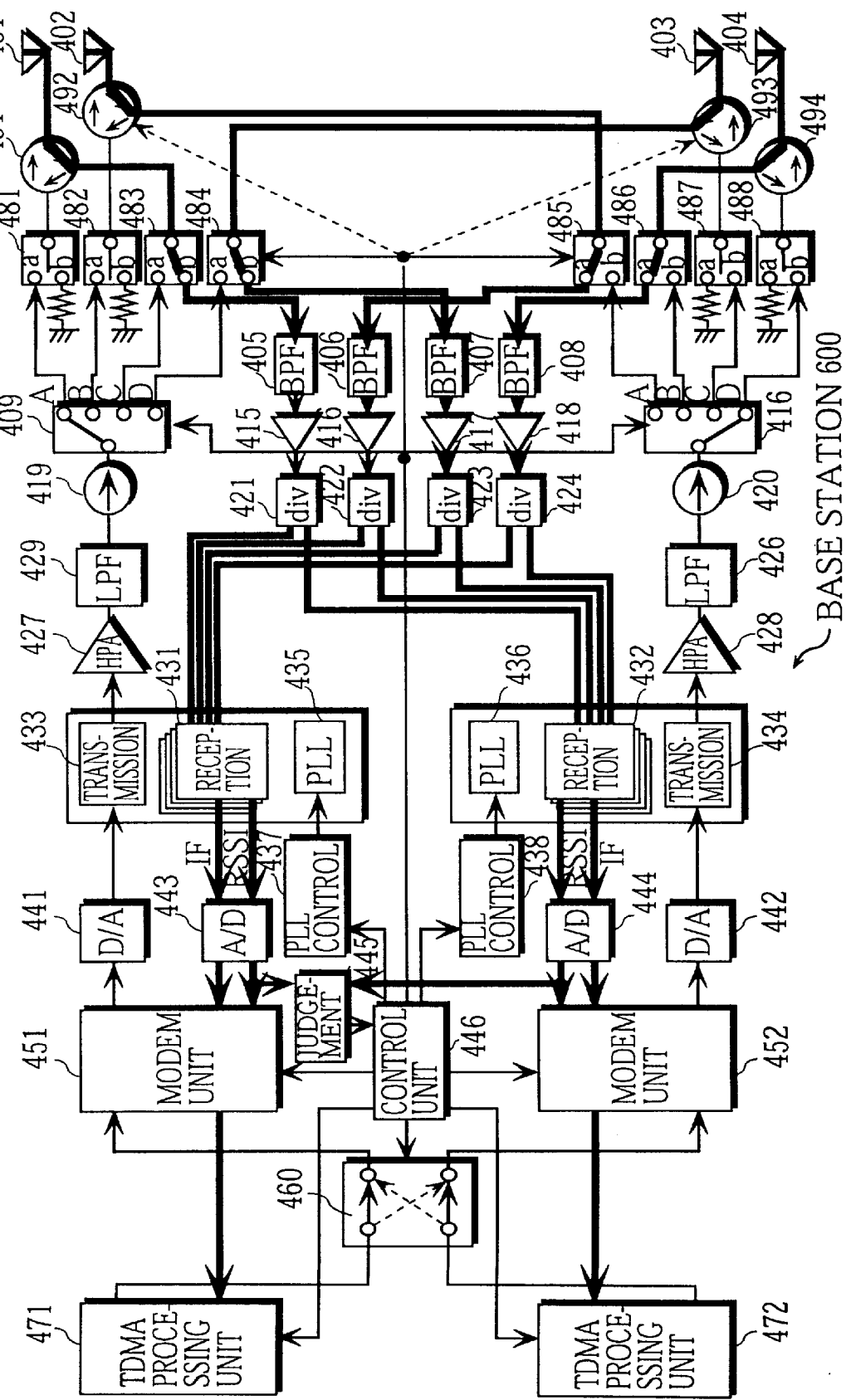

In this figure, the column of "ANTENNA SELECTION" shows selection results of the control unit 446 with respect to the transmission antennas of the system 1 and system 2. Pairs of selected antennas exclude the combination of the same antennas. When receiving signals, all the four antennas are connected. The column of "SETTING OF ANTENNA SELECTING SWITCH" shows the control logic of the control unit 446 with respect to the switches 495, 496, 481 to 488, and 460, that is, the selection command contents of the select signals outputted to those switches from the control unit 446. Alphabetical characters "A" and "B" indicate the output terminals of the antenna selecting switches 495 and 496. Alphabetical characters "a" and "b" indicate the input terminals of the switches 481 to 488 shown in FIG. 19. Alphabetical characters "S" and "C" indicate straight connection and cross connection, respectively. Alphabetical characters "A" to "L" in the column of "TRANSMISSION" indicate antenna selection patterns. The transmission signal routes corresponding to the antenna selection patterns are shown in FIGS. 24A to 24L. The reception signal routes are shown in FIG. 24M.

Figure 23:
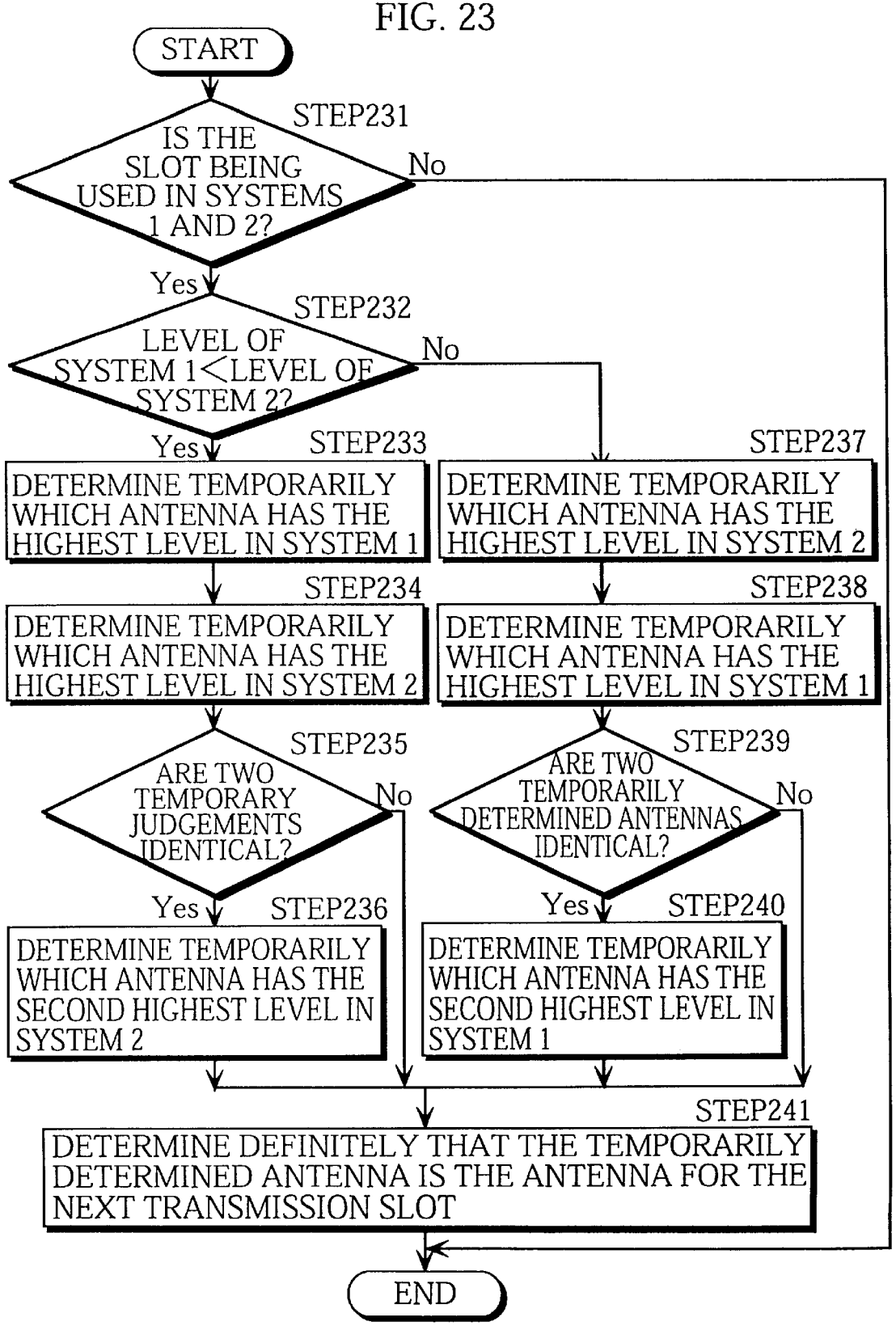
FIG. 23 is a flowchart showing the antenna selecting process in the downstream time slots for the system 1 and system 2 performed by the control unit.

FIG. 23 is a flowchart showing the antenna selecting process performed by the control unit 446 with respect to the system 1 and system 2 in the downstream time slots, i.e., the "ANTENNA SELECTION" process shown in FIG. 22.

Upon receipt of the judgement of the judging unit 445 in a reception time slot, the control unit 446 determines the transmission antenna for each system in the following transmission time slot corresponding to the reception time slot, and selects the determined transmission antenna for each system in the transmission time slot.

If the system 1 and system 2 are occupied in the present time slot (step 231), the control unit 446 compares the highest input signal level in the system 1 with the highest input signal level in the system 2 (step 232).

If the highest input signal level in the system 1 is smaller, the judging unit 445 temporarily allocates the antenna that shows the highest input signal level in the system 1 as the next transmission antenna for the system 1 (step 233). Likewise, the antenna that shows the highest input signal level in the system 2 is temporarily allocated as the next transmission antenna for the system 2 (step 234). If the same antenna is temporarily allocated to the system 1 and system 2, the selecting unit 132 selects the system 1 having the lower input signal level over the system 2, and therefore, the transmission antenna temporarily allocated to the system 2 has to be replaced, that is, an antenna other than the antenna allocated to the system 1 (the second highest level antenna) should be allocated as the transmission antenna for the system 2 (step 236).

If the highest input signal level of the system 1 is not lower, the antenna selection is conducted in the same manner (steps 237 to 240).

The control unit 446 then definitely determines the antennas temporarily allocated to the system 1 and system 2 as the transmission antennas in the next transmission time slot (step 241).

In each time slot, a pair of antennas different from each other are allocated for the system 1 and system 2. In the transmission time slot following the present reception time slot, the control unit 446 controls each switch so that antennas will be selected in accordance with the judgements of the judging unit 445. Thus, the transmission electric waves of the system 1 and system 2 are outputted separately from two different antennas The following is an explanation of the operation of the base station 600 of the sixth embodiment having the structure as described above.

As in an example judgement of the judging unit 445 shown in 21, the second time slots (RX2:RX6) are occupied for communication both in the system 1 and system 2. Upon receipt of the judgement result in the reception time slot, the control unit 446 selects ANT1 (antenna 401) that shows the highest input signal level in the system 1, and ANT4 (antenna 404) that shows the highest input signal level in the system 2 as the transmission antennas in accordance with the flowchart of FIG. 23. In the following transmission time slot, the control unit 446 controls the selection operation. This case fits in the selection pattern C shown in FIG. 22, and the control unit 446 controls each switch in the manner represented by the selection pattern C.

As in an example judgement of the judging unit 445 shown in FIG. 21 the third time slots are used in both the system 1 and system 2. Upon receipt of the judgement result in the present reception time slot, the control unit 446 allocates ANT1 that shows the highest input signal level in both systems to the system 1, and ANT2 that shows the second highest input signal level in both systems to the system 2. In the transmission time slot following the present reception time slot, the control unit 446 controls the selection operation. This case fits in the selection pattern A shown in FIG. 22, and the control unit 446 controls each switch as represented in the selection pattern A. The transmission signal routes of both systems are as shown in FIG. 24A. In this case, the transmission signals of the system 2 are sent to ANT2 via the circulator 492.

As an example judgement result of the judging unit 445 shown in FIG. 21, the fourth time slots are occupied both in the system 1 and system 2. In this case, ANT1 is allocated to the system 1, while ANT2 is allocated to the system 2. The judgement result is shown as the signal transmission routes in FIG. 24A.

The antenna selecting switches 495 and 496 may have only three output ports instead of four output ports. They require no transmission paths toward the transmit-receive selecting switches 483 and 486.

The positions of the cross switch 460 and the modem units 451 and 452 are interchangeable, that is, baseband signals or IF signals may be interchanged between the two systems.

According to the sixth embodiment, antennas are selected so that transmission signals of the two systems are transmitted through different antennas, eliminating the need for composing units and dramatically reducing power loss. As a result, HPAs having a low precision can be used for the base station so as to reduce production costs.

Since the combination of the cross switch 460 and the circulators 492 and 493 constitutes a part of the antenna switching at the stage of baseband signal or IF signal, the circuit structure and the production of the RF unit are relatively simple.

In the above embodiments, each base station is provided with four antennas, but the number of antennas is not necessarily four, though it is preferably three or more. In any case, each antenna should be provided with a receiving unit and a transmit-receive selecting switch.

In the above embodiments, each base station communicates with mobile stations, simultaneously using two TDD frames consisting of a first TDD frame and a second TDD frame. However, the number of TDD frames used by a base station is not necessarily two. If three or more TDD frames are used, the base station is able to communicate with more mobile stations, because only one channel among those TDD frames needs to be allocated as a control channel. If the base station simultaneously uses three TDD frames, for instance, it should be provided with three HPAs, three antenna selecting switches, three input selecting switches, and three modem units. In such a case, each receiving unit should be provided with three tuning circuits and three RSSI circuits. In each TDD frame used, the judging unit determines input signal levels in descending order down to the number of the TDD frames used, and antennas corresponding to the input signal levels. The judging unit then outputs the judgements to the selecting unit (or control unit).

If the same antenna is judged to be the first antenna for modulation signals of different systems corresponding to the TDD frames used in transmission diversity, the selecting unit (or control unit) allocates the first antenna a modulation signal whose highest input signal level is the lowest among the modulation signals having the same antenna as the first antenna. A modulation signal whose highest input signal level is the second lowest among the modulation signals having the same antenna as the first antenna is then allocated to the second antenna among the modulation signals. If the second antenna is the same as the first antenna judged for the modulation signals of another system, the modulation signal having a lower input signal level given by the antenna is allocated to the second antenna. As described above, if the same antenna is selected for modulation signals of different systems, the selecting unit (or control unit) allocates the antenna a modulation signal having a lower input signal level given by the antenna, while it allocates a lower level antenna a modulation signal having a higher input signal level.

If the base station simultaneously uses three TDD frames, for instance, the judging unit 131 determines the first antenna that gives the highest input signal level, the second antenna that gives the second highest input signal level, and the third antenna that gives the third highest input signal level, with respect to the modulation signals of the system 1, system 2, and system 3 allocated to the first TDD frame, the second TDD frame, and the third TDD frame, respectively, in the present upstream time slots.

FIG. 25 shows the input signal (RSSI) levels of each system in the upstream time slots and the judgements of the judging unit in the case where the base station has four antennas and uses three systems. The numerals shown in the upper half of each column are the input signal levels, and the numerals shown in the lower half of each column are the priorities determined. The input signal levels shown in the table are all normalized for convenience.

The selecting unit (control unit) conducts antenna allocation in accordance with the above judgement results. As shown in FIG. 25, ANT2 is judged to be the first antenna for the system and system 2. The judging unit (or control unit) compares the input signal level of the system 1 with that of the system 2, and allocates ANT2 to the system having the lower input signal level. As the input signal levels of the system 1 and system 2 are 91 and 90, respectively, in FIG. 25, ANT2 is allocated to the system 2.

ANT1, which is the second antenna for the system 1, is supposed to be allocated to the system 1, but it is the first antenna for the system 3. Thus, ANT1 has to be allocated to either the system 1 or the system 3. In this case, ANT1 is allocated to the system 1, because the system 1 has the lower input signal level. Since ANT3 is the second antenna for the system 3, ANT3 is allocated to the system 3 unless there is another system having ANT3 as the first antenna. FIG. 26 shows the relationship between the allocated antennas and the systems.

In the above antenna allocation method using the selecting unit (or control unit), the antenna that has the highest sensitivity is selected as the transmission antenna for the modulation signal of each system. In the case where the number of TDD frames simultaneously used is large, the transmission antenna selection requires an undesirably long period of time, because every time the same antenna is selected as the transmission antenna for two or more systems, the input signal level given by each antenna is compared. If the same antenna is the first antenna for two or more systems, the modulation signal whose highest input signal level is the lowest among the modulation signals may be allocated to the first antenna, and a modulation signal whose highest input signal level is not the highest among the modulation signals may be allocated to the second antenna, which is selected from the remaining antennas other than the first antenna.

More specifically, in the case where the same antenna is the first antenna for the modulation signal of the system 1 and the modulation signal of the system 2, the highest input signal level of the system 1 is compared with the highest input signal level of the system 2, and if the highest input signal level of the modulation signal of the system 2 is lower, the selecting unit 132 allocates the first antenna the modulation signal of the system 2. As for the modulation signal of the system 1, the second antenna is allocated as the transmission antenna. If the second antenna for the modulation signal of the system 1 is the same as the first antenna for the modulation signal of the system 3, the selecting unit 132 allocates the modulation signal of the system 3 to the first antenna, and the modulation signal of the system 1 to the third antenna.

The selecting unit (or control unit) may allocate the transmission antennas for the modulation signals of the systems having the same antenna as the first antenna in ascending order with respect to the highest input signal levels of the modulation signals. In the case where the same antenna is selected as the first antenna for both modulation signals of the system 1 and system 2, the selecting unit (or control unit) may allocate the modulation signals to the antennas other than the first antenna for the modulation signal of the system 3 in ascending order with respect to the highest input signal levels of the modulation signals.

In the above embodiments, the time slot #1 of the first TDD frame is allocated as a control channel, and the remaining channels are used as communication channels. However, the time slots are not necessarily allocated in that manner, and the time slot #1 of the first TDD frame and the time slot #1 of the second TDD frame may be both used as control channels. Different carrier frequencies may be allocated to the communication channels (#2 to #8). A common carrier frequency may be allocated to each communication channel (#2 to #4) of the first TDD frame, while another common carrier frequency which is different from the common carrier frequency allocated to the communication channels of the first TDD frame may be allocated to each communication channel (#5 to #8) of the second TDD frame.

In the above embodiments, the reception diversity has been described with reference to the antenna selection diversity, but the reception diversity method is not limited to the antenna selection diversity, and it may be composition diversity. If composition diversity is conducted, the base station is preferably provided with a phase control circuit, because each input signal received by each antenna has a phase difference. The phase control circuit performs composition by combining phase differences between the input signals. However, the phase control circuit is not necessarily provided in composition diversity.

Industrial Field in which the Invention can be Utilized

The base station of the present invention comprises an RF unit which generates high-frequency transmission signals, an antenna selecting switch unit which switches connection of the transmission signal output from one antenna to another, a cross switch which switches the transmission route between straight connection and cross connection by inputting transmission data from two data output units interchangeably to transmitting units 433 and 434 of the RF unit, and a control unit which controls the antenna selecting unit so as to connect each transmission signal to a different antenna. This base station can be used in mobile diversity communication systems such as PHS.

What is claimed is:

1. A base station for diversity mobile communication systems, characterized by comprising:

a plurality of generating means for generating different high-frequency transmission signals;

a plurality of antennas, the number of which is the same as or larger than the number of the generating means;

switching means for switching connection of each output terminal of the plurality of generating means from one antenna to another; and control means for controlling the switching means so that the output terminals of the generating means will be connected to different antennas, wherein the different high-frequency transmission signals generated by the plurality of generating means are simultaneously transmitted from antennas respectively connected to the plurality of generating means.

2. A base station according to claim 1, further comprising:

measuring means for measuring a reception signal level for each antenna; and level judging means for judging which antenna has the highest reception signal level among all antennas for each of the reception signals having different frequencies, wherein the control means comprises:

allocating means for allocating the highest level antenna to a high-frequency transmission signal corresponding to each reception signal;

overlap judging means for judging whether an antenna judged by the level judging means is repeatedly allocated to different high-frequency transmission signals;

re-allocating means for, in the case that the antenna is judged to be repeatedly allocated to different high-frequency transmission signals, allocating the high-frequency signal whose highest reception signal level is higher than the other to another antenna; and switch control means for controlling the switching means in accordance with allocation and re-allocation results.

3. A base station according to claim 2, further comprising:
a plurality of data output means for outputting transmission data, the number of the data output means being the same as the generating means; and
interchanging means for inputting transmission data from the plurality of data output means interchangeably to the plurality of generating means,
wherein
the control means collectively controls the switching means and the interchanging means so that output terminals of the plurality of generating means will be connected to different antennas.

4. A base station according to claim 3, wherein
the plurality of generating means include first generating means and second generating means,
the switching means comprises:
   a first switching unit for switching connection of the output terminal of the first generating means from one antenna to another among a predetermined group in the plurality of antennas; and
   a second switching unit for switching connection of the output terminal of the second generating means from one antenna to another among the remaining antennas.

5. A base station according to claim 4, wherein
the switching means further includes a third switching unit for bypass-connecting the output terminal of the second generating means to one of the antennas on the first switching unit side, and the output terminal of the first generating means to one of the antennas on the second switching unit side.

6. A base station according to claim 3, wherein
the first and second generating means each has a PLL unit for generating local frequency signals to determine the frequency of each transmission signal, and
the control means controls the local frequency of each PLL unit so that the carrier frequencies of the first and second generating means will be interchanged when the interchanging means conducts cross connection.

7. A base station according to claim 6, wherein
the plurality of generating means include first generating means and second generating means, and
the switching means comprises:
   a first switching unit for switching connection of the output terminal of the first generating means from one antenna to another among a predetermined group in the plurality of antennas; and
   a second switching unit for switching connection of the output terminal of the second generating means from one antenna to another among the remaining antennas.

8. A base station according to claim 7, wherein
the switching means further comprises a third switching unit for bypass-connecting the output terminal of the second generating means to one of the antennas on the first switching unit side, and the output terminal of the first generating means to one of the antennas on the second switching unit side.

9. A base station for diversity mobile communication systems, characterized by comprising:
first and second generating means for generating different high-frequency transmission signals;
a plurality of antennas, the number of which is the same as or larger than the number of the generating means;
switching means for switching connection of each output terminal of the first and second generating means from one antenna to another;
first and second data output means for outputting transmission data, the number of data output means being the same as the number of generating means;
interchanging means for inputting transmission data from the first and second data output means interchangeably to the first and second generating means; and
control means for controlling the switching means and the interchanging means so that the output terminals of the generating means will be connected to different antennas, wherein
the different high-frequency transmission signals generated by the first and second generating means are simultaneously transmitted from antennas respectively connected to the first and second generating means.

10. A base station for diversity mobile communication systems, characterized by comprising:
first and second generating means for generating different high-frequency transmission signals;
a plurality of antennas, the number of which is the same as or larger than the number of the generating means;
switching means for switching connection of each output terminal of the first and second generating means from one antenna to another;
first and second data output means for outputting transmission data, the number of data output means being the same as the number of generating means;
interchanging means for inputting transmission data from the first and second data output means interchangeably to the first and second generating means;
control means for controlling the switching means and the interchanging means so that the output terminals of the generating means will be connected to different antennas; and
wherein the first and second generating means each has a PLL unit for generating local frequency signals to determine the frequency of each transmission signal, and
the control means controls the local frequency of the PLL unit so that the carrier waves of the firs and second generating means will be interchanged when the interchanging means conducts cross connection.

11. A base station according to claim 10, wherein
the switching means comprises:
   a first switching unit for switching connection of the output terminal of the first generating means from one antenna to another among a predetermined group in the plurality of antennas;
   a second switching unit for switching connection of the output terminal of the second generating means from one antenna to another among the remaining antennas; and
   a third switching unit for bypass-connecting the output terminal of the second generating means to one of the antennas on the first switching unit side, and the output terminal of the first generating means to one of the antennas on the second switching unit side.

12. A base station according to claim 11, wherein
the first switching unit includes:
   a first selecting switch having an input terminal to which the output terminal of the first generating means is connected, the same number of output terminals as the antennas of the predetermined group, and a bypass output terminal; and
   transmit-receive selecting circulators for connecting the output terminals of the first selecting switch to the antennas, one circulator being provided for each antenna of the predetermined group, the second switching unit includes:
a second selecting switch having an input terminal to which the output terminal of the second generating means is connected, the same number of output terminals as the remaining antennas, and a bypass output terminal; and
transmit-receive selecting circulators for connecting the output terminals of the second selecting switch to the antennas, one circulator being provided for each of the remaining antennas, the third switching unit includes:
a first bypass line for connecting the bypass output terminal of the first selecting switch to one of the circulators of the second switching unit; and
a second bypass line for connecting the bypass output terminal of the second selecting switch to one of the circulators of the first switching unit, and
the control unit controls bypass connections by open-or short-circuiting one port of each circulator to which the first and second bypass lines are connected so as to cause total reflection of power.

13. A base station for diversity mobile communication systems, characterized by comprising:
first and second generating means for generating different high-frequency transmission signals;
a plurality of antennas, the number of which is the same as or larger than the number of the generating means;
switching means for switching connection of each output terminal of the first and second generating means from one antenna to another;
first and second data output means for outputting transmission data, the number of data output means being the same as the number of generating means;
interchanging means for inputting transmission data from the first and second data output means interchangeably to the first and second generating means; and
control means for controlling the switching means and the interchanging means so that the output terminals of the generating means will be connected to different antennas;

the base station further comprising:
measuring means for measuring the level of an input signal corresponding to each transmission signal for each antenna; and
level judging means for judging which antenna has the highest input signal level for each carrier wave,
wherein the control means includes:
allocating means for allocating an antenna which has been judged to have the highest input signal level for each carrier wave;
overlap judging means for judging whether the same antenna is repeatedly allocated to different carrier waves;
re-allocating means for, in the case where the same antenna is allocated to different carrier waves, allocating another antenna to the carrier wave whose highest input signal level is higher than the other; and
switch control means for controlling the switching means in accordance with allocation and re-allocation results.

14. A base station according to claim 13, wherein
the first and second generating means each has a PLL unit for generating local frequency signals to determine the frequency of each transmission signal, and the control means controls the local frequency of each PLL unit so that the carrier frequencies of the first and second generating means will be interchanged when the interchanging means conducts cross connection.

15. A base station according to claim 14, wherein
the switching means comprises:
a first switching unit for switching connection of the output terminal of the first generating means from one antenna to another among a predetermined group in the plurality of antennas;
a second switching unit for switching connection of the output terminal of the second generating means from one antenna to another; and
a third switching unit for bypass-connecting the output terminal of the second generating means to one of the antennas on the first switching unit side, and the output terminal of the first generating means to one of the antennas on the second switching unit side.

16. A base station according to claim 15, wherein
the first switching unit includes:
a first selecting switch having an input terminal to which the output terminal of the first generating means is connected, the same number of output terminals as the antennas of the predetermined group, and a bypass output terminal; and
transmit-receive selecting circulators for connecting the output terminals of the first selecting switch to the antennas, one circulator being provided for each antenna of the predetermined group, the second switching unit includes:
a second selecting switch having an input terminal to which the output terminal of the second generating means is connected, the same number of output terminals as the remaining antennas, and a bypass output terminal; and
transmit-receive selecting circulators for connecting the output terminals of the second selecting switch to the antennas, one circulator being provided for each of the remaining antennas, the third switching unit includes:
a first bypass line for connecting the bypass output terminal of the first selecting switch to one of the circulators of the second switching unit; and
a second bypass line for connecting the bypass output terminal of the second selecting switch to one of the circulators of th e first switching unit, and
the control unit controls bypass connections by open-or short-circuiting one port of each circulator to which the first and second bypass lines are connected so as to cause total reflection of power.

17. A base station for mobile communication systems performing diversity as well as transmission and reception by time-division bidirectional multiplex using synchronized time-division frames on two carrier waves, characterized by comprising:
four antennas;
first generating means and second generating means for gene rating high-frequency transmission signals, each having a PLL unit for generating local frequency signals to determine the carrier frequency of each transmission signal;
a first switching unit for switching connection of the output terminal of the first generating means between predetermined two of the four antennas;
a second switching unit for switching connection of the output terminal of the second generating means between the remaining two antennas;

a third switching unit for bypass-connecting the output terminal of the second generating means to one of the predetermined two antennas, and the output terminal of the first generating means to one of the remaining two antennas;

first and second data output means for outputting transmission data;

interchanging means for inputting transmission data from the first and second data output means interchangeably to the first and second generating means; and control means for controlling the first, second, and third switching units, and the interchanging means so that the output terminals of the generating means will be connected to different antennas, and also controlling the PLL unit so that the carrier frequencies of the first and second generating means will be interchanged when the interchanging means conducts cross connection.

18. A base station according to claim 17, wherein the first switching unit includes:
   a first selecting switch having an input terminal to which the output terminal of the first generating means is connected, the same number of output terminals as the predetermined two antennas, and a bypass output terminal; and
   transmit-receive selecting circulators for connecting the output terminals of the first selecting switch to the antennas, one circulator being provided for each of the predetermined two antennas, the second switching unit includes:
   a second selecting switch having an input terminal to which the output terminal of the second generating means is connected, the same number of output terminals as the remaining two antennas, and a bypass output terminal; and
   transmit-receive selecting circulators for connecting the output terminals of the second selecting switch to the antennas, one circulator being provided for each of the remaining two antennas, the third switching unit includes:
   a first bypass line for connecting the bypass output terminal of the first selecting switch to one of the circulators of the second switching unit; and
   a second bypass line for connecting the bypass output terminal of the second selecting switch to one of the circulators of the first switching unit, and the control unit controls bypass connections by open-or short-circuiting one port of each circulator to which the first and second bypass lines are connected so as to cause total reflection of power.

19. A base station according to claim 18, further comprising:

measuring means for measuring the level of an input signal corresponding to each transmission signal for each antenna; and level judging means for judging which antenna has the highest input signal level for each carrier wave, wherein the control means includes:
   allocating means for allocating an antenna which has been judged to have the highest input signal level for each carrier wave;
   overlap judging means for judging whether the same antenna is allocated to different carrier waves;
   re-allocating means for allocating another antenna to the carrier wave that has the highest input signal level in the case where the same antenna is allocated to different carrier waves; and
   switch control means for controlling the switching means in accordance with allocation and re-allocation results.

20. A base station for mobile communication systems of TDMA-TDD access type which communicates with mobile stations by transmission diversity with a plurality of communication channels allotted to time-division slots, characterized by comprising:

a plurality of transmission signal generating means for generating transmission signals by modulating transmission data and converting the frequency of each modulation signal for each communication channel;

amplifying means for amplifying the transmission signals, the number of the amplifying means being the same as or larger than the number of transmission signal generating means;

transmit-receive antennas, the number of which is the same as the number of amplifying means;

first-level antenna determining means for determining a first-level antenna for each of two or more systems provided for each reception slot, wherein the first-level antenna, among all transmit-receive antennas, gives the highest input signal level, overlap judging means for judging, for each reception slot, whether the same transmit receive antenna is determined as the first-level antenna in two systems among the two or more systems;

allocating means for allocating different antennas to the two systems if the overlap judging means judges positively; and transmitting means for transmitting outputs of the amplifying means using antennas allocated by the allocating means if the overlap judging means judges positively, and transmitting outputs of the amplifying means using the first-level antennas determined by the determining means if the overlap judging means judges negatively.

21. A base station according to claim 20, wherein the allocating means comprises:
   identifying means for identifying an antenna that gives a lower input level, out of two antennas determined as the first-level antenna for the two systems; and
   first allocating means for allocating the first-level antenna to the antenna identified by the identifying means.

22. A base station for mobile communication systems of TDMA-TDD access type which communicates through diversity with a plurality of communication channels including a control channel in time-division slots, characterized by comprising:

a system unit including at least a first transmit-receive system and a second transmit-receive system;

a plurality of transmit-receive antennas for transmitting and receiving, the number of the antennas being the same as or larger than the transmit-receive systems;

transmitting means for generating transmission signals of the system unit and outputting the transmission signals to the transmit-receive antennas;

receiving means for demodulating input signals from the transmit-receive antennas to IF signals, calculating the input signal level received by each transmit-receive antenna, and then outputting the input signal level, the number of input signals being determined by multiplying the number of systems by the number of transmit-receive antennas;

PLL means for supplying local frequency signals for each system so that the signals processed by the transmitting means and the receiving means will correspond to the frequencies of the communication channels;

PLL control means for controlling the local frequencies supplied by the PLL means;

determining means for determining through which antenna the transmission is conducted at the input signal level, and outputting the determined result;

TDMA processing means provided for each transmit-receive system for TDMA-processing signals to be inputted into the transmitting means and signals outputted from the receiving means, so that the signals will be in synchronization with frames made up of the slots;

modem means arranged between the transmitting and receiving means, and the TDMA processing means, for modulating signals to be sent to the transmitting means, and demodulating signals sent from the receiving means;

system switching means for switching between the first transmit-receive system and the second transmit-receive system; and control means for controlling, in accordance with the output of the determining means, the system switching means so that signals from the transmit-receive systems will be transmitted through different transmit-receive antennas, the transmit-receive antennas used for the signal transmission each having the highest input signal level in the respective transmit-receive systems, and that the transmission signals will be processed by different transmitting means, the control means further controlling the PLL control means for each selected system so as to adjust local frequencies.

23. A base station according to claim 22, wherein the determining means determines that the antenna that has been judged to have the highest input signal level in a plurality of systems should be allocated for the system whose highest input signal level is the lowest among all the systems.

* * * * *